(12) United States Patent
Wu et al.

(10) Patent No.: US 11,172,372 B2
(45) Date of Patent: Nov. 9, 2021

(54) INFORMATION TRANSMISSION METHOD AND APPARATUS

(71) Applicant: Huawei Technologies Co., Ltd., Shenzhen (CN)

(72) Inventors: Tao Wu, Shenzhen (CN); Teyan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/749,477

(22) Filed: Jan. 22, 2020

(65) Prior Publication Data

US 2020/0162934 A1 May 21, 2020

Related U.S. Application Data

(63) Continuation of application No. PCT/CN2018/096212, filed on Jul. 19, 2018.

(30) Foreign Application Priority Data

Jul. 24, 2017 (CN) .......................... 201710607129.2

(51) Int. Cl.
*H04W 16/14* (2009.01)
*H04W 16/28* (2009.01)
(Continued)

(52) U.S. Cl.
CPC ........... *H04W 16/14* (2013.01); *H04W 16/28* (2013.01); *H04W 24/10* (2013.01); *H04W 48/16* (2013.01); *H04W 72/082* (2013.01)

(58) Field of Classification Search
CPC ..... H04W 16/14; H04W 16/28; H04W 24/10; H04W 48/16; H04W 72/082
See application file for complete search history.

(56) References Cited

U.S. PATENT DOCUMENTS 7,174,167 B2 2/2007 Otsuka et al.
8,223,736 B2 7/2012 Rofougaran
(Continued)

FOREIGN PATENT DOCUMENTS

CN 1251968 A 5/2000
CN 1937446 A 3/2007
(Continued)

OTHER PUBLICATIONS

Yuan, G., "A Same Frequency Interference Avoidance Scheme of Dense Wireless Local Area Network Based on Power and Bandwidth Allocation," A thesis submitted to Xidian University in partial fulfillment of the requirements for the degree of Master in information and communication engineering, Nov. 2014, 77 pages.

*Primary Examiner* — Dai Phuong
(74) *Attorney, Agent, or Firm* — Slater Matsil, LLP

(57) ABSTRACT

An information transmission method and apparatus, the method including determining, by a first communications apparatus, an area in which a terminal device is located, where the area includes overlapping coverage area between the first communications apparatus and at least one second communications apparatus, and, non-overlapping coverage area between the first communications apparatus and the at least one second communications apparatus, and the first communications apparatus is adjacent to the at least one second communications apparatus, and sending, by the first communications apparatus, information to the terminal device through a first channel if the terminal device is located in the overlapping coverage area, and sending, by the first communications apparatus, information to the terminal device through a second channel if the terminal device is located in the non-overlapping coverage areas.

18 Claims, 11 Drawing Sheets

(51) Int. Cl.
*H04W 24/10* (2009.01)
*H04W 48/16* (2009.01)
*H04W 72/08* (2009.01)

(56) References Cited

U.S. PATENT DOCUMENTS

| | | | |
|---|---|---|---|
| 2006/0286983 A1* | 12/2006 | Otsuka | H04W 16/32 455/444 |
| 2008/0146233 A1* | 6/2008 | Tsai | H04W 36/32 455/437 |
| 2013/0115890 A1 | 5/2013 | Dore et al. | |
| 2014/0302859 A1* | 10/2014 | Nama | H04W 16/10 455/447 |
| 2016/0192372 A1 | 6/2016 | Peleg et al. | |

FOREIGN PATENT DOCUMENTS

| | | |
|---|---|---|
| CN | 101489303 A | 7/2009 |
| CN | 102724684 A | 10/2012 |
| CN | 103796213 A | 5/2014 |
| CN | 106357365 A | 1/2017 |
| WO | 2016054819 A1 | 4/2016 |

\* cited by examiner

Overlapping coverage area

Non-overlapping coverage area

Downlink channel allocation

Uplink channel allocation

Uplink and downlink channel allocation (downlink channel, uplink channel)

INFORMATION TRANSMISSION METHOD AND APPARATUS

CROSS-REFERENCE TO RELATED APPLICATIONS

This application is a continuation of International Application No. PCT/CN2018/096212, filed on Jul. 19, 2018, which claims priority to Chinese Patent Application No. 201710607129.2, filed on Jul. 24, 2017. The disclosures of the aforementioned applications are incorporated herein by reference in their entireties.

TECHNICAL FIELD

Embodiments of this application relate to the communications field, and in particular, to an information transmission method and apparatus in the communications field.

BACKGROUND

Frequency reuse (FR) means reuse of a same frequency, so that the same frequency is used in different areas, for example, an area covered by a network device (for example, a base station or an access point (AP)) or a part (a sector antenna) of the network device. These areas in which the same frequency is used need to be separated from each other at a particular distance (referred to as an intra-frequency reuse distance) to satisfy an allowed indicator to which interference is suppressed.

During high-frequency transmission, for example, in a technology in which a frequency band of 31 GHz to 35 GHz or 61 GHz to 69 GHz is used for transmission, because spatial channel fading for high-frequency transmission is higher than that for a low-frequency transmission, an antenna beamforming technology needs to be used at both a transmitter and a receiver to ensure transmission. When the beamforming technology is used, whether interference may be caused by information transmission between two adjacent network devices depends on locations of a transmit signal source and an interfering signal source. Therefore, how to combine the beamforming technology with the frequency reuse technology to reduce interference between adjacent network devices is a technical problem to be urgently resolved.

SUMMARY

Embodiments of this application provide an information transmission method and apparatus, to help reduce interference between adjacent network devices.

According to a first aspect, an information transmission method is provided, including determining, by a first communications apparatus, an area in which a terminal device is located, where the area includes an overlapping coverage area between the first communications apparatus and at least one second communications apparatus, and, a non-overlapping coverage area between the first communications apparatus and the at least one second communications apparatus, and the first communications apparatus is adjacent to the at least one second communications apparatus, sending, by the first communications apparatus, information to the terminal device through a first channel if the terminal device is located in the overlapping coverage area, and sending, by the first communications apparatus, information to the terminal device through a second channel different from the first channel if the terminal device is located in the non-overlapping coverage area, and information sent by the second communications apparatus is through the first channel in the overlapping coverage area between the at least one second communications apparatus and the first communications apparatus, and information sent by the second communications apparatus is through the second channel in the non-overlapping coverage area of the at least one second communications apparatus and the first communications apparatus.

It should be understood that the first communications apparatus and the second communications apparatus may be specifically network devices, downlink transmission in the overlapping coverage area corresponds to the first channel, and downlink transmission in the non-overlapping coverage area corresponds to the second channel. In this embodiment of this application, a channel is used to represent a frequency resource used for information transmission between a network device and the terminal device. To be specific, in an overlapping coverage area, a first frequency resource may be used for downlink information transmission between the network device and the terminal device, and in a non-overlapping coverage area, a second frequency resource may be used for downlink information transmission between the network device and the terminal device. It should be further understood that a correspondence between an area and a channel may be agreed on by the network device and the terminal device according to a protocol, or may be configured by the network device for the terminal device by using signaling. This is not limited in this embodiment of this application.

According to the information transmission method in this embodiment of this application, the same first channel is used for downlink information transmission in overlapping coverage area of adjacent network devices, and the second channel different from the first channel is used for downlink information transmission in non-overlapping coverage area of the adjacent network devices. This helps reduce interference between the adjacent network devices, and improves system performance.

In a first possible implementation of the first aspect, the method further includes receiving, by the first communications apparatus through the second channel, information sent by the terminal device if the terminal device is located in the overlapping coverage area, and receiving, by the first communications apparatus through the first channel, information sent by the terminal device if the terminal device is located in the non-overlapping coverage area, and information received by the at least one second communication apparatus through the second channel in the overlapping coverage area between the at least one second communications apparatus and the first communications apparatus, and information received by the at least one second communication apparatus through the first channel in the non-overlapping coverage area between the at least one second communications apparatus and the first communications apparatus.

Specifically, the first communications apparatus performs uplink transmission through the second channel and downlink transmission through the first channel in the overlapping coverage area of the first communications apparatus and the at least one second communications apparatus, and performs uplink transmission through the first channel and downlink transmission through the second channel in the non-overlapping coverage area of the first communications apparatus and the at least one second communications apparatus. The second communications apparatus adjacent to the first communications apparatus performs uplink transmission through the second channel and downlink transmission through the first channel in the overlapping coverage area of the second communications apparatus and the first communications apparatus, and performs uplink transmission through the first channel and downlink transmission through the second channel in the non-overlapping coverage area of the second communications apparatus and the first communications apparatus.

The information transmission method in this embodiment of this application can not only avoid interference caused by downlink transmission of the second communications apparatus to downlink transmission of the first communications apparatus and interference caused by uplink transmission of the second communications apparatus to uplink transmission of the first communications apparatus, but also avoid interference caused by uplink transmission (or downlink transmission) of the second communications apparatus to downlink transmission (or uplink transmission) of the first communications apparatus, and improve system performance.

With reference to the foregoing possible implementation of the first aspect, in another possible implementation of the first aspect, the method further includes if the terminal device is located in the overlapping coverage area, sending, by the first communications apparatus, information to the terminal device through the first channel, and receiving, by the first communications apparatus through the second channel different from the first channel, information sent by the terminal device, and in the overlapping coverage area of the at least one second communications apparatus and the first communications apparatus, sending, by the at least one second communications apparatus, information through the first channel, and receiving information through the second channel different from the first channel.

With reference to the foregoing possible implementations of the first aspect, in another possible implementation of the first aspect, the method further includes if the terminal device is located in the non-overlapping coverage area, sending, by the first communications apparatus, information to the terminal device through the second channel different from the first channel, and receiving, by the first communications apparatus through the first channel, information sent by the terminal device, and in the non-overlapping coverage area of the at least one second communications apparatus and the first communications apparatus, sending, by the at least one second communications apparatus, information through the second channel different from the first channel, and receiving information through the first channel.

With reference to the foregoing possible implementations of the first aspect, in another possible implementation of the first aspect, the determining, by a first communications apparatus, an area in which a terminal device is located includes sending, by the first communications apparatus, measurement information through the first channel in the overlapping coverage area, and sending the measurement information through the second channel in the non-overlapping coverage area, sending, by the at least one second communications apparatus, the measurement information through the first channel in the overlapping coverage area, and sending the measurement information through the second channel in the non-overlapping coverage area, where the measurement information is used by the terminal device to measure a channel, receiving, by the first communications apparatus, access request information sent by the terminal device through the first channel or the second channel, where the access request information is used by the terminal device to request to access the first communications apparatus by using the first channel or the second channel, and determining, by the first communications apparatus based on the access request information, the area in which the terminal device is located.

Specifically, the first communications apparatus and the at least one second communications apparatus may send the measurement information through the first channel in the overlapping coverage area, and send the measurement information through the second channel in the non-overlapping coverage area. For example, the measurement information is broadcast beacon (Beacon) information or broadcast pilot information, and is used by the terminal device to measure a channel. A location of the terminal device determines a signal that can be received by the terminal device and energy of the received signal. Therefore, the terminal device can determine, based on a sender of the received measurement information and signal energy of the measurement information, the area in which the terminal device is located. After determining the area in which the terminal device is located, the terminal device may choose to use a channel corresponding to the area to send the access request information to the first communications apparatus or the second communications apparatus. In this embodiment of this application, assuming that the terminal device is located in the coverage area of the first communications apparatus, the terminal device selects the first channel or the second channel to send the access request information to the first communications apparatus, to request to access the first communications apparatus, and the first communications apparatus may determine, based on the access request information sent by the terminal device, the area in which the terminal device is located.

With reference to the foregoing possible implementations of the first aspect, in another possible implementation of the first aspect, the access request information includes at least one of the following information signal energy of measurement information from the first communications apparatus on the first channel, signal energy of measurement information from the first communications apparatus on the second channel, signal energy of the at least one second communications apparatus on the first channel, and signal energy of the at least one second communications apparatus on the second channel, the determining, by the first communications apparatus based on a channel used by the terminal device to send the access request information, the area in which the terminal device is located includes if the access request information includes the signal energy of measurement information from the first communications apparatus on the second channel and the signal energy of the at least one second communications apparatus on the first channel, and a difference obtained by subtracting the signal energy of the at least one second communications apparatus on the first channel from the signal energy of measurement information from the first communications apparatus on the second channel is greater than a first threshold, determining, by the first communications apparatus, that the terminal device is located in the non-overlapping coverage area of the first communications apparatus, if the access request information includes the signal energy of measurement information from the first communications apparatus on the first channel and the signal energy of measurement information from the first communications apparatus on the second channel, and an absolute value of a difference between the signal energy of measurement information from the first communications apparatus on the first channel and the signal energy of measurement information from the first communications apparatus on the second channel is less than the first threshold, determining, by the first communications apparatus, that the terminal device is located at a common boundary between the overlapping coverage area of the first communications apparatus and the non-overlapping coverage area of the first communications apparatus, if the access request information includes the signal energy of measurement information from the first communications apparatus on the first channel and the signal energy of the at least one second communications apparatus on the first channel, and a difference obtained by subtracting the signal energy of the at least one second communications apparatus on the first channel from the signal energy of measurement information from the first communications apparatus on the first channel is greater than the first threshold, determining, by the first communications apparatus, that the terminal device is located in the overlapping coverage area of the first communications apparatus, and if the access request information includes the signal energy of measurement information from the first communications apparatus on the first channel and the signal energy of the at least one second communications apparatus on the first channel, and an absolute value of the difference between the signal energy of measurement information from the first communications apparatus on the first channel and the signal energy of the at least one second communications apparatus on the first channel is less than the first threshold, determining, by the first communications apparatus, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, determining, by the first communications apparatus based on a remaining channel capacity of the first channel and a remaining channel capacity of the second channel, a channel used for information transmission between the first communications apparatus and the terminal device, and if the terminal device is located at the common boundary between the overlapping coverage area of the first communications apparatus and the overlapping coverage area of the at least one second communications apparatus, determining, by the first communications apparatus based on the remaining channel capacity of the first channel, whether to allow the terminal device to access the first communications apparatus.

Specifically, to help the first communications apparatus distinguish between different cases, the access request information may carry energy of a signal received by the terminal device, a network device identifier, a channel sequence number, and signal energy or a signal-to-noise ratio. This is not limited in this embodiment of this application. After receiving the access request information, the first communications apparatus may determine, based on information in the access request information, the area in which the terminal device is located.

It should be understood that the first communications apparatus and the second communications apparatus send broadcast information (for example, beacon information) through the first channel in respective overlapping coverage area, and send broadcast information through the second channel in respective non-overlapping coverage area. In a case in which a beamforming technology is used, beam energy of the first communications apparatus in the non-overlapping coverage area mainly covers the non-overlapping coverage area of the first communications apparatus, and energy of a signal received in another area is quite low or the signal cannot be received, and beam energy sent by the first communications apparatus in the overlapping coverage area mainly covers the overlapping coverage area of the first communications apparatus, energy of a signal received in the non-overlapping coverage area of the first communications apparatus is quite low or the signal cannot be received, and a relatively strong signal may be received in both the overlapping coverage area and the non-overlapping coverage area of the second communications apparatus.

According to a second aspect, another information transmission method is provided, including determining, by a first communications apparatus, an area in which a terminal device is located, where the area includes an overlapping coverage area between the first communications apparatus and at least one second communications apparatus, and, a non-overlapping coverage area between the first communications apparatus and the at least one second communications apparatus, and the first communications apparatus is adjacent to the at least one second communications apparatus, receiving, by the first communications apparatus through a second channel, information sent by the terminal device if the terminal device is located in the overlapping coverage area, and receiving, by the first communications apparatus through the first channel, information sent by the terminal device if the terminal device is located in the non-overlapping coverage area, and receiving, by the at least one second communications apparatus, information through the second channel in the overlapping coverage area of the at least one second communications apparatus and the first communications apparatus, and receiving information through the first channel in the non-overlapping coverage area of the second communications apparatus and the first communications apparatus.

It should be understood that uplink transmission in the overlapping coverage area corresponds to the second channel, and uplink transmission in the non-overlapping coverage area corresponds to the first channel. In this embodiment of this application, a channel is used to represent a frequency resource used for information transmission between a network device and the terminal device. To be specific, in an overlapping coverage area, a second frequency resource may be used for uplink information transmission between the network device and the terminal device, and in a non-overlapping coverage area, a first frequency resource may be used for uplink information transmission between the network device and the terminal device. It should be further understood that a correspondence between an area and a channel may be agreed on by the network device and the terminal device according to a protocol, or may be configured by the network device for the terminal device by using signaling. This is not limited in this embodiment of this application.

According to the information transmission method in this embodiment of this application, the same first channel is used for uplink information transmission in overlapping coverage area of adjacent network devices, and the second channel different from the first channel is used for uplink information transmission in non-overlapping coverage area of the adjacent network devices. This helps reduce interference between the adjacent network devices, and improves system performance.

In a first possible implementation of the second aspect, the determining, by a first communications apparatus, an area in which a terminal device is located includes sending, by the first communications apparatus, measurement information through the first channel in the overlapping coverage area, and sending the measurement information through the second channel in the non-overlapping coverage area, sending, by the at least one second communications apparatus, the measurement information through the first channel in the overlapping coverage area, and sending the measurement information through the second channel in the non-overlapping coverage area, where the measurement information is used by the terminal device to measure a channel, receiving, by the first communications apparatus, access request information sent by the terminal device through the first channel or the second channel, where the access request information is used by the terminal device to request to access the first communications apparatus by using the first channel or the second channel, and determining, by the first communications apparatus based on the access request information, the area in which the terminal device is located.

With reference to the foregoing possible implementation of the second aspect, in another possible implementation of the second aspect, the access request information includes at least one of the following information signal energy of measurement information from the first communications apparatus on the first channel, signal energy of measurement information from the first communications apparatus on the second channel, signal energy of the at least one second communications apparatus on the first channel, and signal energy of the at least one second communications apparatus on the second channel, the determining, by the first communications apparatus based on a channel used by the terminal device to send the access request information, the area in which the terminal device is located includes if the access request information includes the signal energy of measurement information from the first communications apparatus on the second channel and the signal energy of the at least one second communications apparatus on the first channel, and a difference obtained by subtracting the signal energy of the at least one second communications apparatus on the first channel from the signal energy of measurement information from the first communications apparatus on the second channel is greater than a first threshold, determining, by the first communications apparatus, that the terminal device is located in the non-overlapping coverage area of the first communications apparatus, if the access request information includes the signal energy of measurement information from the first communications apparatus on the first channel and the signal energy of measurement information from the first communications apparatus on the second channel, and an absolute value of a difference between the signal energy of measurement information from the first communications apparatus on the first channel and the signal energy of measurement information from the first communications apparatus on the second channel is less than the first threshold, determining, by the first communications apparatus, that the terminal device is located at a common boundary between the overlapping coverage area of the first communications apparatus and the non-overlapping coverage area of the first communications apparatus, if the access request information includes the signal energy of measurement information from the first communications apparatus on the first channel and the signal energy of the at least one second communications apparatus on the first channel, and a difference obtained by subtracting the signal energy of the at least one second communications apparatus on the first channel from the signal energy of measurement information from the first communications apparatus on the first channel is greater than the first threshold, determining, by the first communications apparatus, that the terminal device is located in the overlapping coverage area of the first communications apparatus, and if the access request information includes the signal energy of measurement information from the first communications apparatus on the first channel and the signal energy of the at least one second communications apparatus on the first channel, and an absolute value of the difference between the signal energy of measurement information from the first communications apparatus on the first channel and the signal energy of the at least one second communications apparatus on the first channel is less than the first threshold, determining, by the first communications apparatus, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, determining, by the first communications apparatus based on a remaining channel capacity of the first channel and a remaining channel capacity of the second channel, a channel used for information transmission between the first communications apparatus and the terminal device, and if the terminal device is located at the common boundary between the overlapping coverage area of the first communications apparatus and the overlapping coverage area of the at least one second communications apparatus, determining, by the first communications apparatus based on the remaining channel capacity of the first channel, whether to allow the terminal device to access the first communications apparatus.

According to a third aspect, another information transmission method is provided, including determining, by a terminal device, an area in which the terminal device is located, where the area includes an overlapping coverage area between a first communications apparatus and at least one second communications apparatus, and, a non-overlapping coverage area between the first communications apparatus and the at least one second communications apparatus, and the first communications apparatus is adjacent to the at least one second communications apparatus, and receiving, by the terminal device through a first channel, information sent by the first communications apparatus and/or the at least one second communications apparatus if the terminal device is located in the overlapping coverage area, and receiving, by the terminal device through a second channel different from the first channel, information sent by the first communications apparatus and/or the at least one second communications apparatus if the terminal device is located in the non-overlapping coverage area.

With reference to the third aspect, in a first possible implementation of the third aspect, the method further includes sending, by the terminal device, information to the first communications apparatus and/or the at least one second communications apparatus through the second channel if the terminal device is located in the overlapping coverage area, and sending, by the terminal device, information to the first communications apparatus and/or the at least one second communications apparatus through the first channel if the terminal device is located in the non-overlapping coverage areas.

With reference to the foregoing possible implementation of the third aspect, in another possible implementation of the third aspect, before the determining, by a terminal device, an area in which the terminal device is located, the method further includes receiving, by the terminal device, measurement information sent by the first communications apparatus and/or the at least one second communications apparatus, where the measurement information is used by the terminal device to measure a channel, and the determining, by a terminal device, an area in which the terminal device is located includes determining, by the terminal device based on the received measurement information and signal energy of the measurement information, the area in which the terminal device is located.

With reference to the foregoing possible implementations of the third aspect, in another possible implementation of the third aspect, the determining, by the terminal device based on the received measurement information and signal energy of the measurement information, the area in which the terminal device is located includes if the terminal device receives the measurement information sent by the first communications apparatus through the second channel and the measurement information sent by the at least one second communications apparatus through the first channel, and a difference obtained by subtracting signal energy of the measurement information sent by the at least one second communications apparatus through the first channel from signal energy of the measurement information sent by the first communications apparatus through the second channel is greater than a first threshold, determining, by the terminal device, that the terminal device is located in the non-overlapping coverage area of the first communications apparatus, if the terminal device receives the measurement information sent by the first communications apparatus through the second channel, the measurement information sent by the first communications apparatus through the first channel, and the measurement information sent by the at least one second communications apparatus through the first channel, and an absolute value of a difference between the signal energy of the measurement information sent by the first communications apparatus through the second channel and signal energy of the measurement information sent by the first communications apparatus through the first channel is less than the first threshold, determining, by the terminal device, that the terminal device is located at a common boundary between the overlapping coverage area of the first communications apparatus and the non-overlapping coverage area of the first communications apparatus, if the terminal device receives the measurement information sent by the first communications apparatus through the first channel and the measurement information sent by the at least one second communications apparatus through the first channel, and a difference obtained by subtracting the signal energy of the measurement information sent by the at least one second communications apparatus through the first channel from the signal energy of the measurement information sent by the first communications apparatus through the first channel is greater than the first threshold, determining, by the terminal device, that the terminal device is located in the overlapping coverage area of the first communications apparatus, and if the terminal device receives the measurement information sent by the first communications apparatus through the first channel and the measurement information sent by the at least one second communications apparatus through the first channel, and an absolute value of the difference between the signal energy of the measurement information sent by the first communications apparatus through the first channel and the signal energy of the measurement information sent by the at least one second communications apparatus through the first channel is less than the first threshold, determining, by the terminal device, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, sending, by the terminal device, access request information to the first communications apparatus through the first channel or the second channel, where the access request information is used to request to access the first communications apparatus, and if the terminal device is located at the common boundary between the overlapping coverage area of the first communications apparatus and the overlapping coverage area of the at least one second communications apparatus, sending, by the terminal device, the access request information to the first communications apparatus through the first channel, or sending the access request information to the at least one second communications apparatus through the first channel.

According to a fourth aspect, another information transmission method is provided, including determining, by a terminal device, an area in which the terminal device is located, where the area includes an overlapping coverage area between a first communications apparatus and at least one second communications apparatus, and, a non-overlapping coverage area between the first communications apparatus and the at least one second communications apparatus, and the first communications apparatus is adjacent to the at least one second communications apparatus, and sending, by the terminal device, information to the first communications apparatus and/or the at least one second communications apparatus through the second channel if the terminal device is located in the overlapping coverage area, and sending, by the terminal device, information to the first communications apparatus and/or the at least one second communications apparatus through the first channel if the terminal device is located in the non-overlapping coverage area.

With reference to the fourth aspect, in a first possible implementation of the fourth aspect, before the determining, by a terminal device, an area in which the terminal device is located, the method further includes receiving, by the terminal device, measurement information sent by the first communications apparatus and/or the at least one second communications apparatus, where the measurement information is used by the terminal device to measure a channel, and the determining, by a terminal device, an area in which the terminal device is located includes determining, by the terminal device based on the received measurement information and signal energy of the measurement information, the area in which the terminal device is located.

With reference to the foregoing possible implementation of the fourth aspect, in another possible implementation of the fourth aspect, the determining, by the terminal device based on the received measurement information and signal energy of the measurement information, the area in which the terminal device is located includes if the terminal device receives the measurement information sent by the first communications apparatus through the second channel and the measurement information sent by the at least one second communications apparatus through the first channel, and a difference obtained by subtracting signal energy of the measurement information sent by the at least one second communications apparatus through the first channel from signal energy of the measurement information sent by the first communications apparatus through the second channel is greater than a first threshold, determining, by the terminal device, that the terminal device is located in the non-overlapping coverage area of the first communications apparatus, if the terminal device receives the measurement information sent by the first communications apparatus through the second channel, the measurement information sent by the first communications apparatus through the first channel, and the measurement information sent by the at least one second communications apparatus through the first channel, and an absolute value of a difference between the signal energy of the measurement information sent by the first communications apparatus through the second channel and signal energy of the measurement information sent by the first communications apparatus through the first channel is less than the first threshold, determining, by the terminal device, that the terminal device is located at a common boundary between the overlapping coverage area of the first communications apparatus and the non-overlapping coverage area of the first communications apparatus, if the terminal device receives the measurement information sent by the first communications apparatus through the first channel and the measurement information sent by the at least one second communications apparatus through the first channel, and a difference obtained by subtracting the signal energy of the measurement information sent by the at least one second communications apparatus through the first channel from the signal energy of the measurement information sent by the first communications apparatus through the first channel is greater than the first threshold, determining, by the terminal device, that the terminal device is located in the overlapping coverage area of the first communications apparatus, and if the terminal device receives the measurement information sent by the first communications apparatus through the first channel and the measurement information sent by the at least one second communications apparatus through the first channel, and an absolute value of the difference between the signal energy of the measurement information sent by the first communications apparatus through the first channel and the signal energy of the measurement information sent by the at least one second communications apparatus through the first channel is less than the first threshold, determining, by the terminal device, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, sending, by the terminal device, access request information to the first communications apparatus through the first channel or the second channel, where the access request information is used to request to access the first communications apparatus, and if the terminal device is located at the common boundary between the overlapping coverage area of the first communications apparatus and the overlapping coverage area of the at least one second communications apparatus, sending, by the terminal device, the access request information to the first communications apparatus through the first channel, or sending the access request information to the at least one second communications apparatus through the first channel.

According to a fifth aspect, an information transmission apparatus is provided, configured to perform the method in any one of the first aspect or the possible implementations of the first aspect. Specifically, the information transmission apparatus includes a unit configured to perform the method in any one of the first aspect or the possible implementations of the first aspect.

According to a sixth aspect, another information transmission apparatus is provided, configured to perform the method in any one of the second aspect or the possible implementations of the second aspect. Specifically, the information transmission apparatus includes a unit configured to perform the method in any one of the second aspect or the possible implementations of the second aspect.

According to a seventh aspect, another information transmission apparatus is provided, configured to perform the method in any one of the third aspect or the possible implementations of the third aspect. Specifically, the information transmission apparatus includes a unit configured to perform the method in any one of the third aspect or the possible implementations of the third aspect.

According to an eighth aspect, another information transmission apparatus is provided, configured to perform the method in any one of the fourth aspect or the possible implementations of the fourth aspect. Specifically, the information transmission apparatus includes a unit configured to perform the method in any one of the fourth aspect or the possible implementations of the fourth aspect.

According to a ninth aspect, a network device is provided. The network device includes a transceiver, a memory, and a processor. The transceiver, the memory, and the processor communicate with each other by using an internal connection path. The memory is configured to store an instruction. The processor is configured to execute the instruction stored in the memory, to control the transceiver to receive a signal or send a signal, and when the processor executes the instruction stored in the memory, the network device enables the processor to perform the method in any one of the first aspect or the possible implementations of the first aspect.

According to a tenth aspect, another network device is provided. The network device includes a transceiver, a memory, and a processor. The transceiver, the memory, and the processor communicate with each other by using an internal connection path. The memory is configured to store an instruction. The processor is configured to execute the instruction stored in the memory, to control the transceiver to receive a signal or send a signal, and when the processor executes the instruction stored in the memory, the network device enables the processor to perform the method in any one of the second aspect or the possible implementations of the second aspect.

According to an eleventh aspect, a terminal device is provided. The terminal device includes a transceiver, a memory, and a processor. The transceiver, the memory, and the processor communicate with each other by using an internal connection path. The memory is configured to store an instruction. The processor is configured to execute the instruction stored in the memory, to control the receiver to receive a signal or send a signal, and when the processor executes the instruction stored in the memory, the terminal device enables the processor to perform the method in any one of the third aspect or the possible implementations of the third aspect.

According to a twelfth aspect, another terminal device is provided. The terminal device includes a transceiver, a memory, and a processor. The transceiver, the memory, and the processor communicate with each other by using an internal connection path. The memory is configured to store an instruction. The processor is configured to execute the instruction stored in the memory, to control the transceiver to receive a signal or send a signal, and when the processor executes the instruction stored in the memory, the terminal device enables the processor to perform the method in any one of the fourth aspect or the possible implementations of the fourth aspect.

According to a thirteenth aspect, a computer-readable medium is provided, configured to store a computer program. The computer program includes an instruction used to perform the method in any one of the first aspect or the possible implementations of the first aspect.

According to a fourteenth aspect, a computer-readable medium is provided, configured to store a computer program. The computer program includes an instruction used to perform the method in any one of the second aspect or the possible implementations of the second aspect.

According to a fifteenth aspect, a computer-readable medium is provided, configured to store a computer program. The computer program includes an instruction used to perform the method in any one of the third aspect or the possible implementations of the third aspect.

According to a sixteenth aspect, a computer-readable medium is provided, configured to store a computer program. The computer program includes an instruction used to perform the method in any one of the fourth aspect or the possible implementations of the fourth aspect.

DETAILED DESCRIPTION OF ILLUSTRATIVE EMBODIMENTS

Figure 1:
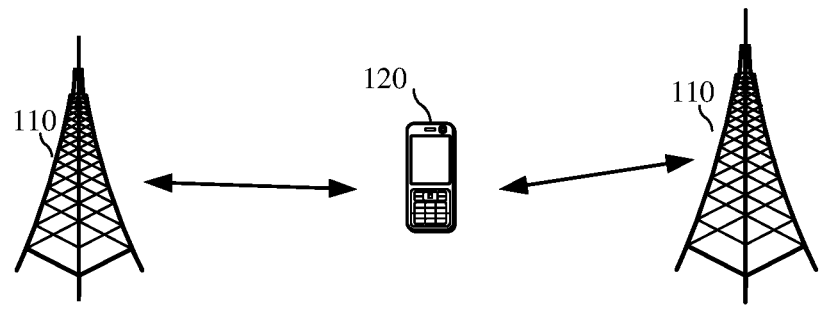
FIG. 1 is a schematic diagram of a communications system according to an embodiment of this application.

The following describes technical solutions in embodiments of this application with reference to accompanying drawings in the embodiments of this application.

It should be understood that the technical solutions in the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future fifth generation (5G) communications system.

It should be further understood that the technical solutions in the embodiments of this application may be further applied to various communications systems based on a non-orthogonal multiple access technology, for example, a sparse code multiple access (SCMA) system. Certainly, SCMA may also be called another name in the communications field. Further, the technical solutions in the embodiments of this application may be applied to a multi-carrier transmission system using the non-orthogonal multiple access technology, for example, an orthogonal frequency division multiplexing (OFDM) system using the non-orthogonal multiple access technology, a filter-bank multi-carrier (FBMC) system, a generalized frequency division multiplexing (GFDM) system, or a filtered orthogonal frequency division multiplexing (filtered-OFDM, F-OFDM) system.

The embodiments of this application may be applicable to an LTE system and a future evolved system such as a 5G system or other wireless communications systems using various radio access technologies, for example, a system using access technologies such as code division multiple access, frequency division multiple access, time division multiple access, orthogonal frequency division multiple access, and single carrier frequency division multiple access, and particularly applicable to a scenario in which channel information needs to be fed back and/or a two-level precoding technology needs to be used, for example, a wireless network using a massive multiple-input multiple-output (MIMO) technology or a wireless network using a distributed antenna technology.

It should be understood that a MIMO technology means that a transmit end device and a receive end device respectively use a plurality of transmit antennas and receive antennas, so that signals are transmitted and received by using the plurality of antennas of the transmit end device and the receive end device, to improve communication quality. In the technology, spatial resources can be fully used, and multiple-input multiple-output is implemented by using the plurality of antennas, so that a system channel capacity can be multiplied without increasing spectrum resources and antenna transmit power.

MIMO may be classified into single-user multiple-input multiple-output (single-user MIMO, SU-MIMO) and multi-user multiple-input multiple-output (multi-user MIMO, MU-MIMO). In massive MIMO, based on a multi-user beamforming principle, several hundreds of antennas are arranged on the transmit end device, to modulate beams for dozens of target receivers, and dozens of signals are simultaneously transmitted on a same frequency resource by performing space signal isolation. Therefore, in the massive MIMO technology, spatial freedom brought by configuration of massive antennas can be fully used to improve spectral efficiency.

FIG. 1 shows a communications system 100 to which the embodiments of this application is applied. The communications system 100 may include at least two network devices no. The network device no may be a device, such as a base station or a base station controller, communicating with a terminal device. Each network device no may provide communication coverage for a particular geographical area, and may communicate with a terminal device (for example, a user equipment (UE)) located in the coverage area (a cell). The network device 110 may be a base transceiver station (BTS) in a GSM system or a code division multiple access (CDMA) system, a NodeB (NB) in a WCDMA system, an evolved NodeB (eNB or eNodeB) in an LTE system, or a radio controller in a cloud radio access network (CRAN). Alternatively, the network device may be a relay station, an access point, a vehicle-mounted device, a wearable device, a network side device in a future 5G network, a network device in a future evolved public land mobile network (PLMN), or the like.

The wireless communications system 100 further includes at least one terminal device 120 located in a coverage area of the network device no. The terminal device 120 may be mobile or fixed. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

FIG. 1 shows an example in which there are two network devices and one terminal device. Optionally, the communications system 100 may include a plurality of network devices, and another quantity of terminal devices may be included in a coverage area of each network device. This is not limited in this embodiment of this application.

Optionally, the wireless communications system 100 may further include another network entity such as a network controller or a mobility management entity. This is not limited in this embodiment of this application.

In addition, the communications system 100 may be a public land mobile network PLMN, a device-to-device (D2D) network, a machine-to-machine (M2M) network, or another network. FIG. 1 is merely a simplified schematic diagram of an example used for ease of understanding. The network system 100 may further include another network device that is not shown in FIG. 1.

Figure 2:
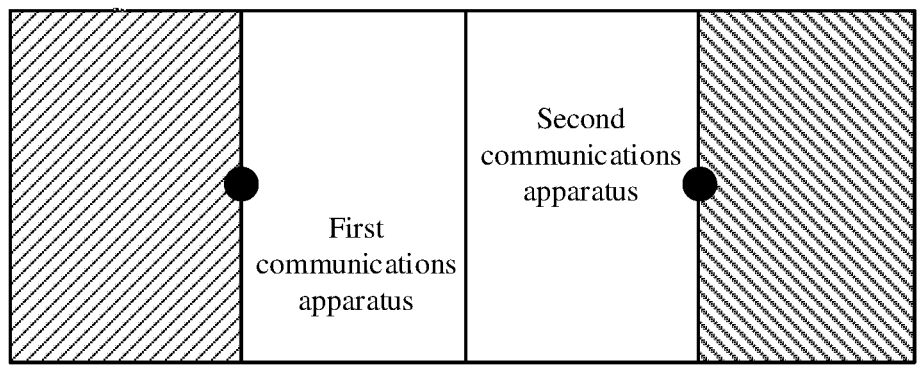
FIG. 2 is a schematic diagram of an application scenario according to an embodiment of this application.
Figure 2:
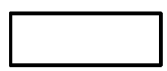
Figure 2:

FIG. 2 is a schematic diagram of an application scenario 200 according to an embodiment of this application. In FIG. 2, coverage areas of a first communications apparatus and a second communications apparatus have an overlapping part, referred to as overlapping coverage areas. A terminal device located in the overlapping coverage areas can receive both a signal sent by the first communications apparatus and a signal sent by the second communications apparatus. A difference between signal energy of the two signals is less than a preset threshold. In the coverage area of the first communications apparatus and the coverage area of the second communications apparatus, other areas different from the overlapping coverage areas are referred to as non-overlapping coverage areas. If a terminal device is located in the non-overlapping coverage areas, even if the terminal device can receive a signal sent by the first communications apparatus and a signal sent by the second communications apparatus, a difference between signal energy of the two signals is greater than or equal to the preset threshold. The threshold may be preconfigured by a system before network planning. For example, the threshold is 10 dB. This is not limited in this embodiment of this application.

It should be understood that the first communications apparatus and the second communications apparatus may be specifically network devices. FIG. 2 merely shows two network devices as an example, and there may be any other quantity of network devices in the application scenario 200. In addition, an area division manner is the same as an area division manner used for the first communications apparatus and the second communications apparatus. This is not limited in this embodiment of this application. It should be further understood that the overlapping coverage areas and the non-overlapping coverage areas may also be referred to as "adjacent areas" and "non-adjacent areas". This is not limited in this embodiment of this application.

For ease of understanding and description, a terminal device located in a coverage area of a first communications apparatus is used as an example for description below. It should be understood that the foregoing system may include any other quantity of terminal devices located in any area. This is not limited in this embodiment of this application.

Figure 3:
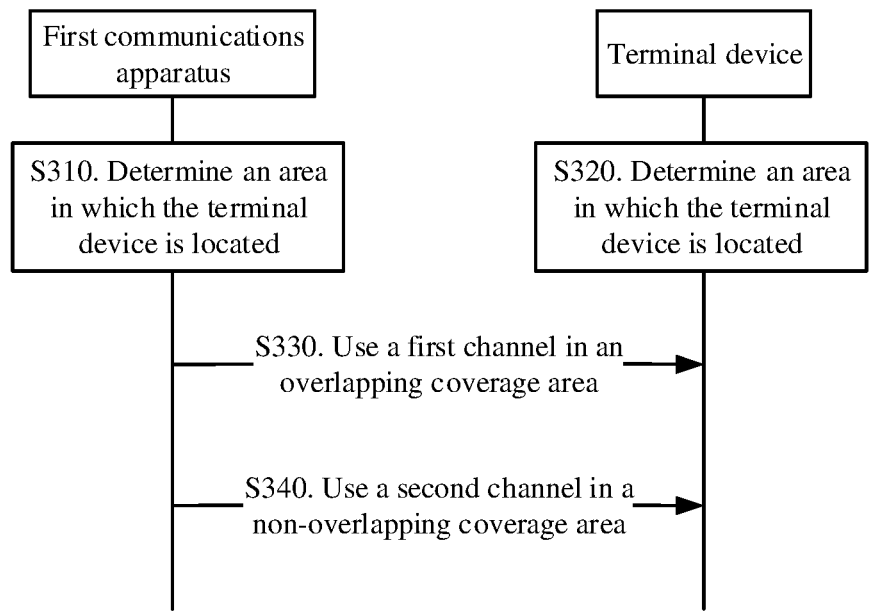
FIG. 3 is a schematic flowchart of an information transmission method according to an embodiment of this application.

FIG. 3 is a schematic flowchart of an information transmission method 300 according to an embodiment of this application. The method 300 may be applied to the communication system 100 shown in FIG. 1 and the application scenario 200 shown in FIG. 2. However, this is not limited in this embodiment of this application.

S310. A first communications apparatus determines an area in which a terminal device is located, where the area includes overlapping coverage area between the first communications apparatus and at least one second communications apparatus, and, non-overlapping coverage area between the first communications apparatus and the at least one second communications apparatus, and the first communications apparatus is adjacent to the at least one second communications apparatus.

S320. The terminal device determines an area in which the terminal device is located, where the area includes the overlapping coverage areas of the first communications apparatus and the at least one second communications apparatus and the non-overlapping coverage areas of the first communications apparatus and the at least one second communications apparatus, and the first communications apparatus is adjacent to the at least one second communications apparatus.

S330. If the terminal device is located in the overlapping coverage areas, the first communications apparatus sends information to the terminal device through a first channel.

Correspondingly, if the terminal device is located in the overlapping coverage areas, the terminal device receives, through the first channel, information sent by the first communications apparatus.

S340. If the terminal device is located in the non-overlapping coverage areas, the first communications apparatus sends information to the terminal device through a second channel different from the first channel, and the at least one second communications apparatus sends information through the first channel in the overlapping coverage areas of the at least one second communications apparatus and the first communications apparatus, and sends information through the second channel in the non-overlapping coverage areas of the at least one second communications apparatus and the first communications apparatus.

Correspondingly, if the terminal device is located in the non-overlapping coverage areas, the terminal device receives, through the second channel different from the first channel, information sent by the first communications apparatus.

According to the information transmission method in this embodiment of this application, the same first channel is used for downlink information transmission in overlapping coverage areas of adjacent network devices, and the second channel different from the first channel is used for downlink information transmission in non-overlapping coverage areas of the adjacent network devices. This helps reduce interference between the adjacent network devices, and improves system performance.

Specifically, before information transmission is performed between a network device and the terminal device, both the network device and the terminal device need to determine an area in which the terminal device is located. Further, the network device and the terminal device may select a corresponding channel based on the area in which the terminal device is located, to transmit information. It should be understood that downlink transmission in the overlapping coverage areas corresponds to the first channel, and downlink transmission in the non-overlapping coverage areas corresponds to the second channel. In this embodiment of this application, a channel is used to represent a frequency resource used for information transmission between a network device and the terminal device. To be specific, in an overlapping coverage area, a first frequency resource may be used for downlink information transmission between the network device and the terminal device, and in a non-overlapping coverage area, a second frequency resource may be used for downlink information transmission between the network device and the terminal device. It should be further understood that a correspondence between an area and a channel may be agreed on by the network device and the terminal device according to a protocol, or may be configured by the network device for the terminal device by using signaling. This is not limited in this embodiment of this application.

Therefore, if the terminal device is located in the overlapping coverage area of the first communications apparatus, the first communications apparatus sends information to the terminal device through the first channel, and correspondingly the terminal device receives, through the first channel, information sent by the first communications apparatus, and if the terminal device is located in the non-overlapping coverage area of the first communications apparatus, the first communications apparatus sends information to the terminal device through the second channel, and correspondingly the terminal device receives, through the second channel, information sent by the first communications apparatus. At the same time, to avoid interference caused by information transmission between the at least one second communications apparatus adjacent to the first communications apparatus and another terminal device, the at least one second communications apparatus sends information to the another terminal device through the first channel in the overlapping coverage areas of the at least one second communications apparatus and the first communications apparatus, and sends information to the another terminal device through the second channel in the non-overlapping coverage areas of the at least one second communications apparatus and the first communications apparatus.

Figure 4:
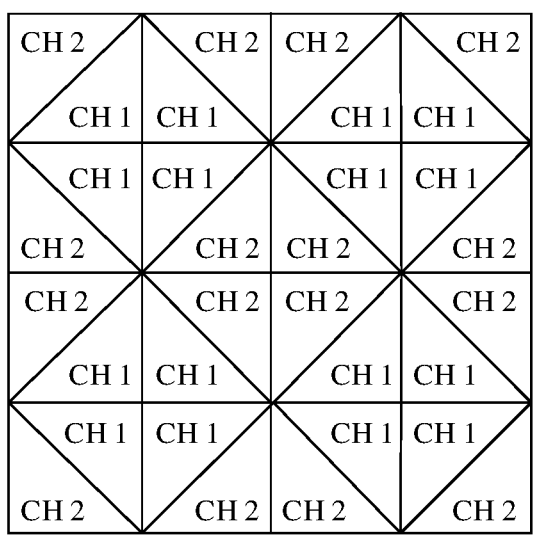
FIG. 4 is a schematic diagram of downlink channel allocation according to an embodiment of this application.

FIG. 4 is a schematic diagram of downlink channel allocation according to an embodiment of this application. Herein, a CH 1 is used to indicate the first channel, and a CH 2 is used to indicate the second channel. A coverage area of each of a plurality of network devices is divided into two areas an area that overlaps with a coverage area of an adjacent network device or an area that does not overlap with the coverage area of the adjacent network device, referred to as an overlapping coverage area and a non-overlapping coverage area.

As shown in FIG. 4, in downlink, the CH 2 is used in an overlapping coverage area, and the CH 1 is used in a non-overlapping coverage area. In an application scenario in which there are a plurality of network devices, this avoids interference between downlink transmission of adjacent network devices and improves system performance.

During high-frequency transmission, for example, in a technology in which 35 GHz or 60 GHz is used, because spatial channel fading is higher than that for a low frequency, an antenna beamforming technology needs to be used at both a transmitter and a receiver to ensure transmission. However, in a transmission process in which the beamforming technology is used, whether there is interference between two adjacent network devices depends on locations of a transmit signal source and a interfering signal source relative to a receive channel. Specifically, when a same frequency is used, and the transmit signal source and the interfering signal source are located in a same direction relative to the receive channel, interference is relatively strong and needs to be avoided. When the transmit signal source and the interfering signal source are located in opposite directions relative to the receive channel, interference is relatively weak and may be ignored.

Interference between two network devices in this embodiment of this application is analyzed in detail below with reference to an interference principle in the beamforming technology. It should be understood that one second communications apparatus is merely used as an example for analysis herein. However, a quantity of second communications apparatuses adjacent to the first communications apparatus is not limited in this embodiment of this application.

Figure 5:
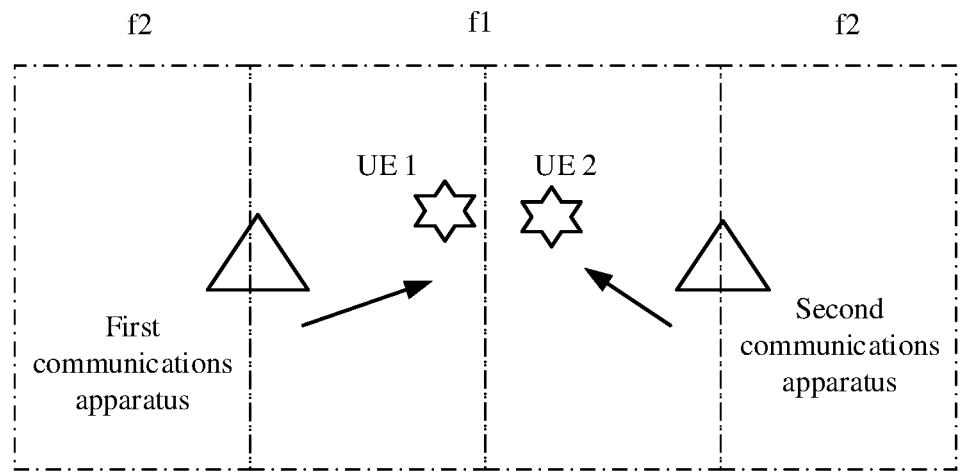
FIG. 5 is a schematic diagram of an information transmission scenario according to an embodiment of this application.

FIG. 5 is a schematic diagram of an information transmission scenario according to an embodiment of this application. In FIG. 5, UE 1 is a terminal device in the coverage area of the first communications apparatus, UE 2 is a terminal device in the coverage area of the second communications apparatus, both the UE 1 and the UE 2 are located in the overlapping coverage areas, and the UE 1 and the UE 2 use a frequency resource f1 (namely, the first channel) to receive information. The first communications apparatus uses f1 to send information to the UE 1, and the second communications apparatus uses f1 to send information to the UE 2. Because the first communications apparatus and the second communications apparatus are located on two sides of the UE 1, namely, in the opposite directions relative to the receive channel, information sent by the second communications apparatus causes no interference to the UE 1. Likewise, information sent by the first communications apparatus causes no interference to the UE 2.

Figure 6:
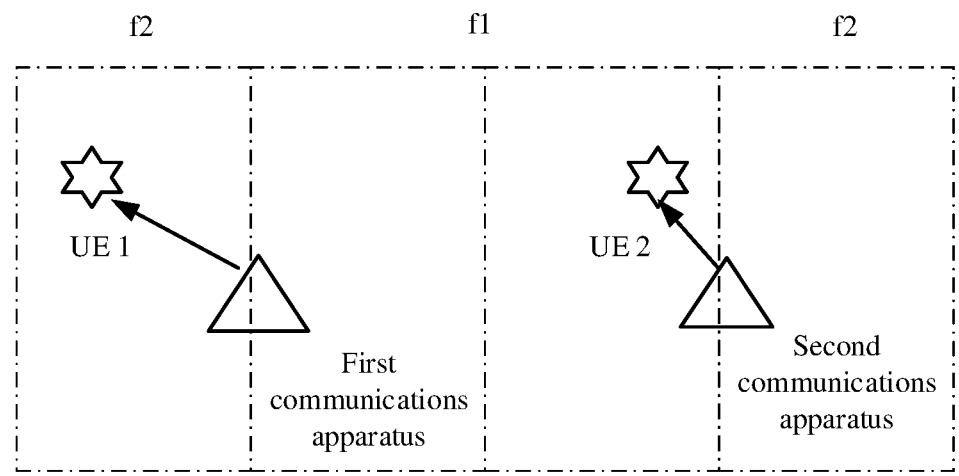
FIG. 6 is a schematic diagram of another information transmission scenario according to an embodiment of this application.

FIG. 6 is a schematic diagram of another information transmission scenario according to an embodiment of this application. In FIG. 6, UE 1 is a terminal device in the coverage area of the first communications apparatus, and UE 2 is a terminal device in the coverage area of the second communications apparatus, the UE 1 is located in the non-overlapping coverage area, and the UE 2 is located in the overlapping coverage area, and the UE 2 uses a frequency resource f1 (namely, the first channel) to receive information, and the UE 1 uses a frequency resource f2 (namely, the second channel) to receive information. The first communications apparatus uses f2 to send information to the UE 1, and the second communications apparatus uses f1 to send information to the UE 2. In this case, although the first communications apparatus and the second communications apparatus are located on the same side of the UE 1, in other words, the transmit signal source and the interfering signal source are located in the same direction relative to the receive channel, the first communications apparatus and the second communications apparatus use different frequency resources. Therefore, a signal sent by the second communications apparatus causes no interference to the UE 1. Likewise, a signal sent by the first communications apparatus causes no interference to the UE 2.

It can be learned from the foregoing analysis that the information transmission method in this embodiment of this application can effectively avoid interference caused by downlink transmission of the second communications apparatus adjacent to the first communications apparatus to downlink transmission of the first communications apparatus. It should be understood that FIG. 5 and FIG. 6 merely show two example downlink transmission cases. For another similar downlink transmission case, details are not described herein again.

According to the information transmission method in this embodiment of this application, the same first channel is used for downlink information transmission in overlapping coverage areas of adjacent network devices, and the second channel different from the first channel is used for downlink information transmission in non-overlapping coverage areas of the adjacent network devices. This helps reduce interference between the adjacent network devices, and improves system performance.

In an optional embodiment, the method further includes receiving, by the first communications apparatus through the second channel, information sent by the terminal device if the terminal device is located in the overlapping coverage areas, and receiving, by the first communications apparatus through the first channel, information sent by the terminal device if the terminal device is located in the non-overlapping coverage areas, and receiving, by the at least one second communications apparatus, information through the second channel in the overlapping coverage areas of the at least one second communications apparatus and the first communications apparatus, and receiving information through the first channel in the non-overlapping coverage areas of the at least one second communications apparatus and the first communications apparatus.

Correspondingly, if the terminal device is located in the overlapping coverage areas, the terminal device sends information to the first communications apparatus through the second channel, and if the terminal device is located in the non-overlapping coverage areas, the terminal device sends information to the first communications apparatus through the first channel.

Specifically, if the terminal device is located in the overlapping coverage area of the first communications apparatus, the terminal device sends information to the first communications apparatus through the second channel, and correspondingly the first communications apparatus receives, through the second channel, information sent by the terminal device. If the terminal device is located in the non-overlapping coverage area of the first communications apparatus, the terminal device sends information to the first communications apparatus through the first channel, and correspondingly the first communications apparatus receives, through the first channel, information sent by the terminal device. At the same time, to avoid interference caused by information transmission between the at least one second communications apparatus adjacent to the first communications apparatus and another terminal device, the at least one second communications apparatus receives information through the second channel in the overlapping coverage areas of the at least one second communications apparatus and the first communications apparatus, and receives information through the first channel in the non-overlapping coverage areas of the at least one second communications apparatus and the first communications apparatus.

In this embodiment of this application, the first communications apparatus performs uplink transmission through the second channel and downlink transmission through the first channel in the overlapping coverage areas of the first communications apparatus and the at least one second communications apparatus, and performs uplink transmission through the first channel and downlink transmission through the second channel in the non-overlapping coverage areas of the first communications apparatus and the at least one second communications apparatus. The second communications apparatus adjacent to the first communications apparatus performs uplink transmission through the second channel and downlink transmission through the first channel in the overlapping coverage areas of the second communications apparatus and the first communications apparatus, and performs uplink transmission through the first channel and downlink transmission through the second channel in the non-overlapping coverage areas of the second communications apparatus and the first communications apparatus. This can not only avoid interference caused by downlink transmission of the second communications apparatus to downlink transmission of the first communications apparatus, but also avoid interference caused by uplink transmission (or downlink transmission) of the second communications apparatus to downlink transmission (or uplink transmission) of the first communications apparatus.

Interference in this embodiment of this application is analyzed below with reference to FIG. 7.

Figure 7:
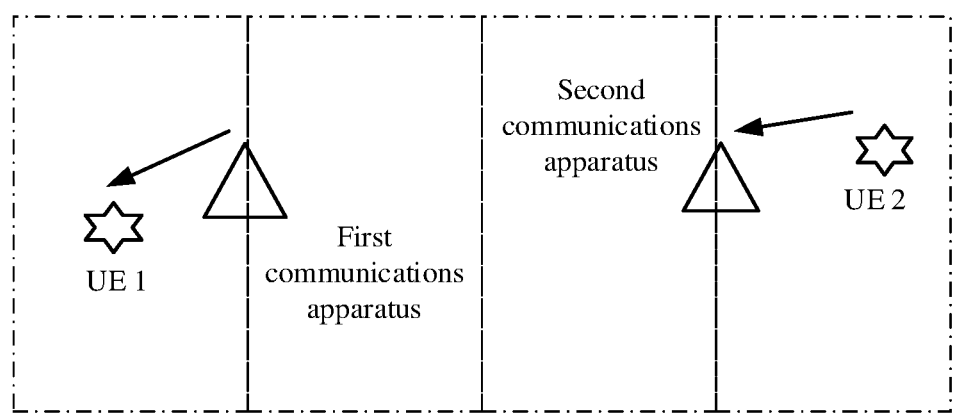
FIG. 7 is a schematic diagram of another information transmission scenario according to an embodiment of this application.

FIG. 7 is a schematic diagram of another information transmission scenario according to an embodiment of this application. In FIG. 7, UE 1 is a terminal device in the coverage area of the first communications apparatus, and UE 2 is a terminal device in the coverage area of the second communications apparatus, both the UE 1 and the UE 2 are located in the non-overlapping coverage areas, and the UE 2 uses a frequency resource f1 (namely, the first channel) to send information, and the UE 1 uses a frequency resource f2 (namely, the second channel) to receive information. The first communications apparatus uses f2 to send information to the UE 1, and the UE 2 uses f1 to send information to the second communications apparatus. In this case, although the UE 2 and the second communications apparatus are located on the same side of the UE 1, in other words, the transmit signal source and the interfering signal source are located in the same direction relative to the receive channel, the first communications apparatus and the UE 2 use different frequency resources. Therefore, a signal sent by the UE 2 causes no interference to the UE 1. Likewise, a signal sent by the first communications apparatus causes no interference to the second communications apparatus.

It can be learned from the foregoing analysis that the information transmission method in this embodiment of this application can effectively avoid interference caused by uplink transmission of the second communications apparatus adjacent to the first communications apparatus to downlink transmission of the first communications apparatus. It should be understood that FIG. 7 merely shows a possible example case. Avoidance of interference caused by downlink transmission of the second communications apparatus to uplink transmission of the first communications apparatus is similar to that in FIG. 6. Details are not described herein again.

Therefore, the information transmission method in this embodiment of this application can not only avoid interference caused by downlink transmission of the second communications apparatus to downlink transmission of the first communications apparatus and interference caused by uplink transmission of the second communications apparatus to uplink transmission of the first communications apparatus, but also avoid interference caused by uplink transmission (or downlink transmission) of the second communications apparatus to downlink transmission (or uplink transmission) of the first communications apparatus, and improve system performance.

In an optional embodiment, the determining, by a first communications apparatus, an area in which a terminal device is located includes sending, by the first communications apparatus, measurement information through the first channel in the overlapping coverage areas, and sending the measurement information through the second channel in the non-overlapping coverage areas, sending, by the at least one second communications apparatus, the measurement information through the first channel in the overlapping coverage areas, and sending the measurement information through the second channel in the non-overlapping coverage areas, where the measurement information is used by the terminal device to measure a channel, receiving, by the first communications apparatus, access request information sent by the terminal device through the first channel or the second channel, where the access request information is used by the terminal device to request to access the first communications apparatus by using the first channel or the second channel, and determining, by the first communications apparatus based on the access request information, the area in which the terminal device is located.

Correspondingly, before the determining, by a terminal device, an area in which the terminal device is located, the method further includes receiving, by the terminal device, the measurement information sent by the first communications apparatus and/or the at least one second communications apparatus, where the measurement information is used by the terminal device to measure a channel, and the determining, by a terminal device, an area in which the terminal device is located includes determining, by the terminal device based on the received measurement information and signal energy of the measurement information, the area in which the terminal device is located.

Specifically, the first communications apparatus and the at least one second communications apparatus may send the measurement information through the first channel in the overlapping coverage areas, and send the measurement information through the second channel in the non-overlapping coverage areas. For example, the measurement information is broadcast beacon information or broadcast pilot information, and is used by the terminal device to measure a channel. A location of the terminal device determines a signal that can be received by the terminal device and energy of the received signal. Therefore, the terminal device can determine, based on a sender of the received measurement information and signal energy of the measurement information, the area in which the terminal device is located.

After determining the area in which the terminal device is located, the terminal device may choose to use a channel corresponding to the area to send the access request information to the first communications apparatus or the second communications apparatus. In this embodiment of this application, assuming that the terminal device is located in the coverage area of the first communications apparatus, the terminal device selects the first channel or the second channel to send the access request information to the first communications apparatus, to request to access the first communications apparatus, and the first communications apparatus may determine, based on the access request information sent by the terminal device, the area in which the terminal device is located.

In an optional embodiment, the determining, by the terminal device based on the received measurement information and signal energy of the measurement information, the area in which the terminal device is located includes if the terminal device receives the measurement information sent by the first communications apparatus through the second channel and the measurement information sent by the at least one second communications apparatus through the first channel, and a difference obtained by subtracting signal energy of the measurement information sent by the at least one second communications apparatus through the first channel from signal energy of the measurement information sent by the first communications apparatus through the second channel is greater than a first threshold, determining, by the terminal device, that the terminal device is located in the non-overlapping coverage area of the first communications apparatus, if the terminal device receives the measurement information sent by the first communications apparatus through the second channel, the measurement information sent by the first communications apparatus through the first channel, and the measurement information sent by the at least one second communications apparatus through the first channel, and an absolute value of a difference between the signal energy of the measurement information sent by the first communications apparatus through the second channel and signal energy of the measurement information sent by the first communications apparatus through the first channel is less than the first threshold, determining, by the terminal device, that the terminal device is located at a common boundary between the overlapping coverage area of the first communications apparatus and the non-overlapping coverage area of the first communications apparatus, if the terminal device receives the measurement information sent by the first communications apparatus through the first channel and the measurement information sent by the at least one second communications apparatus through the first channel, and a difference obtained by subtracting the signal energy of the measurement information sent by the at least one second communications apparatus through the first channel from the signal energy of the measurement information sent by the first communications apparatus through the first channel is greater than the first threshold, determining, by the terminal device, that the terminal device is located in the overlapping coverage area of the first communications apparatus, and if the terminal device receives the measurement information sent by the first communications apparatus through the first channel and the measurement information sent by the at least one second communications apparatus through the first channel, and an absolute value of the difference between the signal energy of the measurement information sent by the first communications apparatus through the first channel and the signal energy of the measurement information sent by the at least one second communications apparatus through the first channel is less than the first threshold, determining, by the terminal device, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, sending, by the terminal device, access request information to the first communications apparatus through the first channel or the second channel, where the access request information is used to request to access the first communications apparatus, and if the terminal device is located at the common boundary between the overlapping coverage area of the first communications apparatus and the overlapping coverage area of the at least one second communications apparatus, sending, by the terminal device, the access request information to the first communications apparatus through the first channel, or sending access request information to the at least one second communications apparatus through the first channel.

In an optional embodiment, the access request information includes at least one of the following information signal energy of measurement information from the first communications apparatus on the first channel, signal energy of measurement information from the first communications apparatus on the second channel, signal energy of the at least one second communications apparatus on the first channel, and signal energy of the at least one second communications apparatus on the second channel, the determining, by the first communications apparatus based on a channel used by the terminal device to send the access request information, the area in which the terminal device is located includes if the access request information includes the signal energy of measurement information from the first communications apparatus on the second channel and the signal energy of the at least one second communications apparatus on the first channel, and a difference obtained by subtracting the signal energy of the at least one second communications apparatus on the first channel from the signal energy of measurement information from the first communications apparatus on the second channel is greater than a first threshold, determining, by the first communications apparatus, that the terminal device is located in the non-overlapping coverage area of the first communications apparatus, if the access request information includes the signal energy of measurement information from the first communications apparatus on the first channel and the signal energy of measurement information from the first communications apparatus on the second channel, and an absolute value of a difference between the signal energy of measurement information from the first communications apparatus on the first channel and the signal energy of measurement information from the first communications apparatus on the second channel is less than the first threshold, determining, by the first communications apparatus, that the terminal device is located at a common boundary between the overlapping coverage area of the first communications apparatus and the non-overlapping coverage area of the first communications apparatus, if the access request information includes the signal energy of measurement information from the first communications apparatus on the first channel and the signal energy of the at least one second communications apparatus on the first channel, and a difference obtained by subtracting the signal energy of the at least one second communications apparatus on the first channel from the signal energy of measurement information from the first communications apparatus on the first channel is greater than the first threshold, determining, by the first communications apparatus, that the terminal device is located in the overlapping coverage area of the first communications apparatus, and if the access request information includes the signal energy of measurement information from the first communications apparatus on the first channel and the signal energy of the at least one second communications apparatus on the first channel, and an absolute value of the difference between the signal energy of measurement information from the first communications apparatus on the first channel and the signal energy of the at least one second communications apparatus on the first channel is less than the first threshold, determining, by the first communications apparatus, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, determining, by the first communications apparatus based on a remaining channel capacity of the first channel and a remaining channel capacity of the second channel, a channel used for information transmission between the first communications apparatus and the terminal device, and if the terminal device is located at the common boundary between the overlapping coverage area of the first communications apparatus and the overlapping coverage area of the at least one second communications apparatus, determining, by the first communications apparatus based on the remaining channel capacity of the first channel, whether to allow the terminal device to access the first communications apparatus.

Specifically, to help the first communications apparatus distinguish between different cases, the access request information may carry energy of a signal received by the terminal device and a network device identifier, for example, a channel sequence number, signal energy or a signal-to-noise ratio, and the network device identifier. This is not limited in this embodiment of this application. After receiving the access request information, the first communications apparatus may determine, based on information in the access request information, the area in which the terminal device is located.

It should be understood that the first communications apparatus and the second communications apparatus send broadcast information (for example, beacon information) through the first channel in respective overlapping coverage areas, and send broadcast information through the second channel in respective non-overlapping coverage areas. In a case in which the beamforming technology is used, beam energy of the first communications apparatus in the non-overlapping coverage areas mainly covers the non-overlapping coverage area of the first communications apparatus, and energy of a signal received in another area is quite low or the signal cannot be received, and beam energy sent by the first communications apparatus in the overlapping coverage areas mainly covers the overlapping coverage area of the first communications apparatus, energy of a signal received in the non-overlapping coverage area of the first communications apparatus is quite low or the signal cannot be received, and a relatively strong signal may be received in both the overlapping coverage area and the non-overlapping coverage area of the second communications apparatus. It should be noted that in this embodiment of this application, the terminal device may ignore a signal whose signal energy is less than a preset threshold, so that the terminal device can better distinguish between, based on a source and an energy value of a received signal, cases in which the terminal device is located in different areas.

Figure 8:
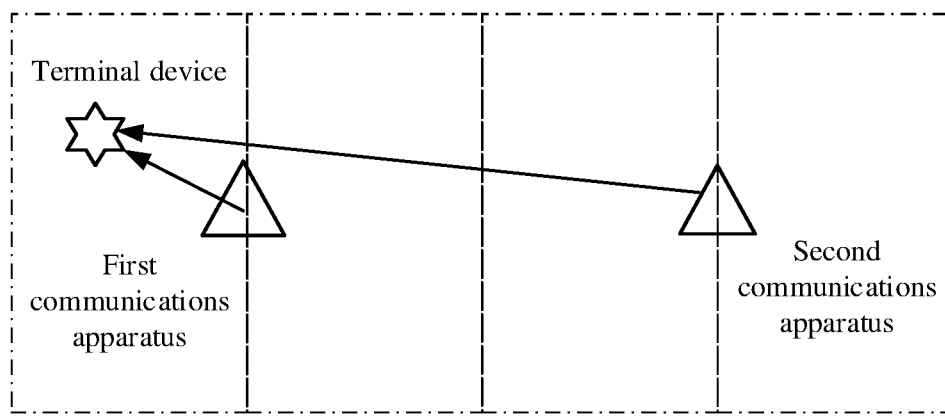
FIG. 8 is a schematic diagram of another information transmission scenario according to an embodiment of this application.

With reference to FIG. 8 to FIG. ii, the following describes in detail four distribution cases in which the terminal device is located in the coverage area of the first communications apparatus. It should be understood that one second communications apparatus is merely used as an example for analysis herein. However, a quantity of second communications apparatuses adjacent to the first communications apparatus is not limited in this embodiment of this application.

FIG. 8 is a schematic diagram of another information transmission scenario according to an embodiment of this application. In FIG. 8, signals received by the terminal device include a signal sent by the first communications apparatus through the second channel, referred to as a signal 1, and a signal sent by the second communications apparatus through the first channel, referred to as a signal 2. Energy of the signal 1 is far higher than energy of the signal 2. In this case, the terminal device may determine that the terminal device is located in the non-overlapping coverage area of the first communications apparatus, and the terminal device may use the second channel corresponding to the non-overlapping coverage area to send the access request information to the first communications apparatus. The access request information includes two sets: {identifier of the first communications apparatus, identifier of the second channel, energy of the signal 1} and {identifier of the second communications apparatus, identifier of the first channel, and energy of the signal 2}. After receiving the access request information sent by the terminal device, the first communications apparatus determines, based on the channel used by the terminal device and specific parameters in the sets, that the terminal device is located in the non-overlapping coverage area, directly allows access of the terminal device, and feeds back an acknowledgment message to the terminal device.

Figure 9:
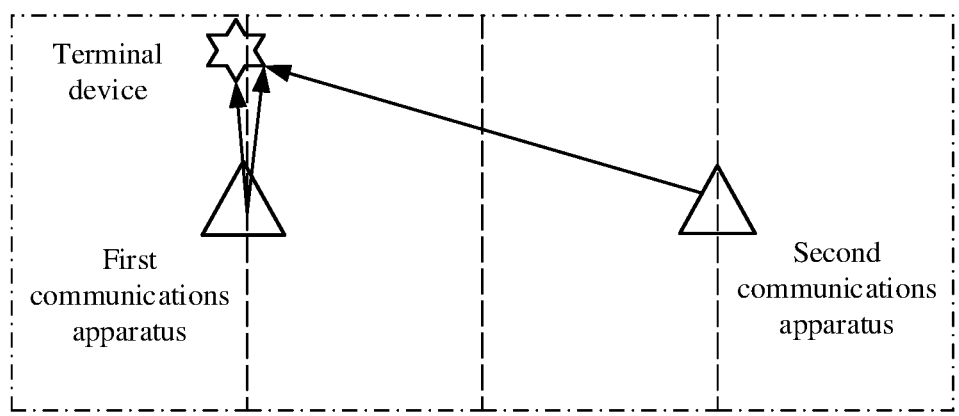
FIG. 9 is a schematic diagram of another information transmission scenario according to an embodiment of this application.

FIG. 9 is a schematic diagram of another information transmission scenario according to an embodiment of this application. In FIG. 9, signals received by the terminal device include a signal sent by the first communications apparatus through the second channel, referred to as a signal 1, a signal sent by the first communications apparatus through the first channel, referred to as a signal 2, and a signal sent by the second communications apparatus through the first channel, referred to as a signal 3. Energy of the signal 1 is equal to energy of the signal 2, but both are far higher than energy of the signal 3. In this case, the terminal device may determine that the terminal device is located at the common boundary between the non-overlapping coverage area of the first communications apparatus and the overlapping coverage area of the first communications apparatus, and the terminal device may select the first channel or the second channel to send the access request information to the first communications apparatus. Specifically, the terminal device may randomly select a channel, or select a channel corresponding to a signal with higher energy in the signal 1 and the signal 2. This is not limited in this embodiment of this application. The access request information includes three sets: {identifier of the first communications apparatus, identifier of the second channel, energy of the signal 1}, {identifier of the first communications apparatus, identifier of the first channel, energy of the signal 2}, and {identifier of the second communications apparatus, identifier of the first channel, and energy of the signal 3}. After receiving the access request information sent by the terminal device, the first communications apparatus determines, based on the channel used by the terminal device and specific parameters in the sets, that the terminal device is located at the common boundary between the non-overlapping coverage area of the first communications apparatus and the overlapping coverage area of the first communications apparatus.

In this case, the first communications apparatus may determine an access channel for the terminal device based on the remaining channel capacity of the first channel and the remaining channel capacity of the second channel. If the channel used by the terminal device to send the access request information is the same as the access channel determined by the first communications apparatus, the first communications apparatus may directly allow access of the terminal device, and feed back an acknowledgment message to the terminal device. If the channel used by the terminal device to send the access request information is different from the access channel determined by the first communications apparatus, the first communications apparatus may feed back a reject message to the terminal device, and the terminal device may re-initiate an access request through another channel.

Figure 10:
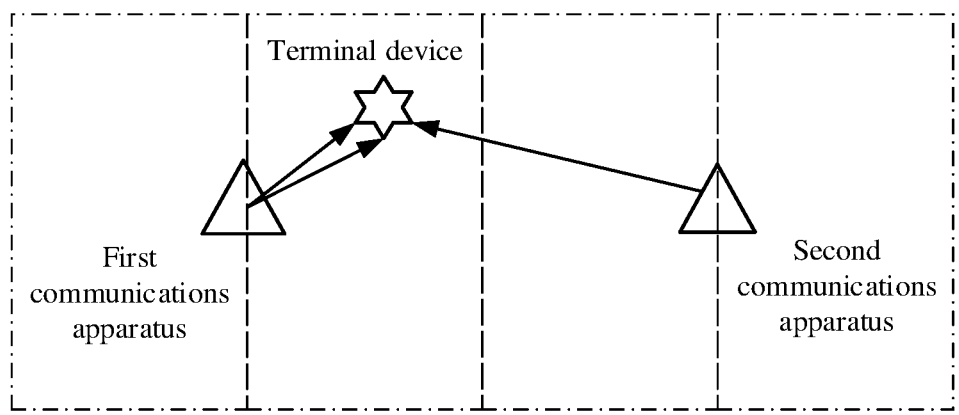
FIG. 10 is a schematic diagram of another information transmission scenario according to an embodiment of this application.

FIG. 10 is a schematic diagram of another information transmission scenario according to an embodiment of this application. In FIG. 10, signals received by the terminal device include a signal sent by the first communications apparatus through the first channel, referred to as a signal 1, and a signal sent by the second communications apparatus through the first channel, referred to as a signal 2. Energy of the signal 1 is higher than energy of the signal 2. In this case, the terminal device may determine that the terminal device is located in the overlapping coverage area of the first communications apparatus, and the terminal device may use the first channel corresponding to the overlapping coverage area to send the access request information to the first communications apparatus. The access request information includes two sets: {identifier of the first communications apparatus, identifier of the first channel, energy of the signal 1} and {identifier of the second communications apparatus, identifier of the first channel, and energy of the signal 2}. After receiving the access request information sent by the terminal device, the first communications apparatus determines, based on the channel used by the terminal device and specific parameters in the sets, that the terminal device is located in the overlapping coverage area, directly allows access of the terminal device, and feeds back an acknowledgment message to the terminal device.

Figure 11:
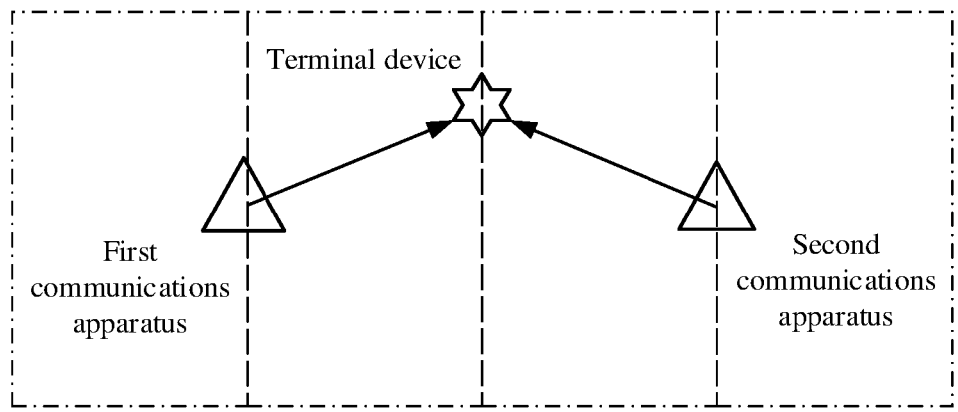
FIG. 11 is a schematic diagram of another information transmission scenario according to an embodiment of this application.

FIG. 11 is a schematic diagram of another information transmission scenario according to an embodiment of this application. In FIG. 11, signals received by the terminal device include a signal sent by the first communications apparatus through the first channel, referred to as a signal 1, and a signal sent by the second communications apparatus through the first channel, referred to as a signal 2. Energy of the signal 1 is equal to energy of the signal 2. In this case, the terminal device may determine that the terminal device is located at the common boundary between the overlapping coverage area of the first communications apparatus and the overlapping coverage area of the second communications apparatus. The terminal device may select either of the first communications apparatus and the second communications apparatus, and use the first channel to send the access request information. Specifically, the terminal device may randomly select a network device, or select a network device corresponding to a signal with higher energy in the signal 1 and the signal 2. This is not limited in this embodiment of this application. The access request information includes two sets: {identifier of the first communications apparatus, identifier of the first channel, energy of the signal 1} and {identifier of the second communications apparatus, identifier of the first channel, and energy of the signal 2}. It is assumed that the terminal device selects the first communications apparatus for access, and sends the access request information to the first communications apparatus. After receiving the access request information sent by the terminal device, the first communications apparatus determines, based on the channel used by the terminal device and specific parameters in the sets, that the terminal device is located at the common boundary between the overlapping coverage area of the first communications apparatus and the overlapping coverage area of the second communications apparatus.

In this case, the first communications apparatus may determine, based on the remaining channel capacity of the first channel, whether to allow access of the terminal device. If the first communications apparatus allows access of the terminal device, the first communications apparatus may feed back an acknowledgment message to the terminal device. If the first communications apparatus does not allow access of the terminal device, the first communications apparatus may feed back a reject message to the terminal device, and the terminal device may re-initiate an access request to the second communications apparatus through the first channel.

It should be understood that the foregoing four cases in which the terminal device is located in the coverage area of the first communications apparatus are merely used as an example for description. A case in which the terminal device is located in the coverage area of the second communications apparatus is similar. Details are not described herein again.

Figure 12:
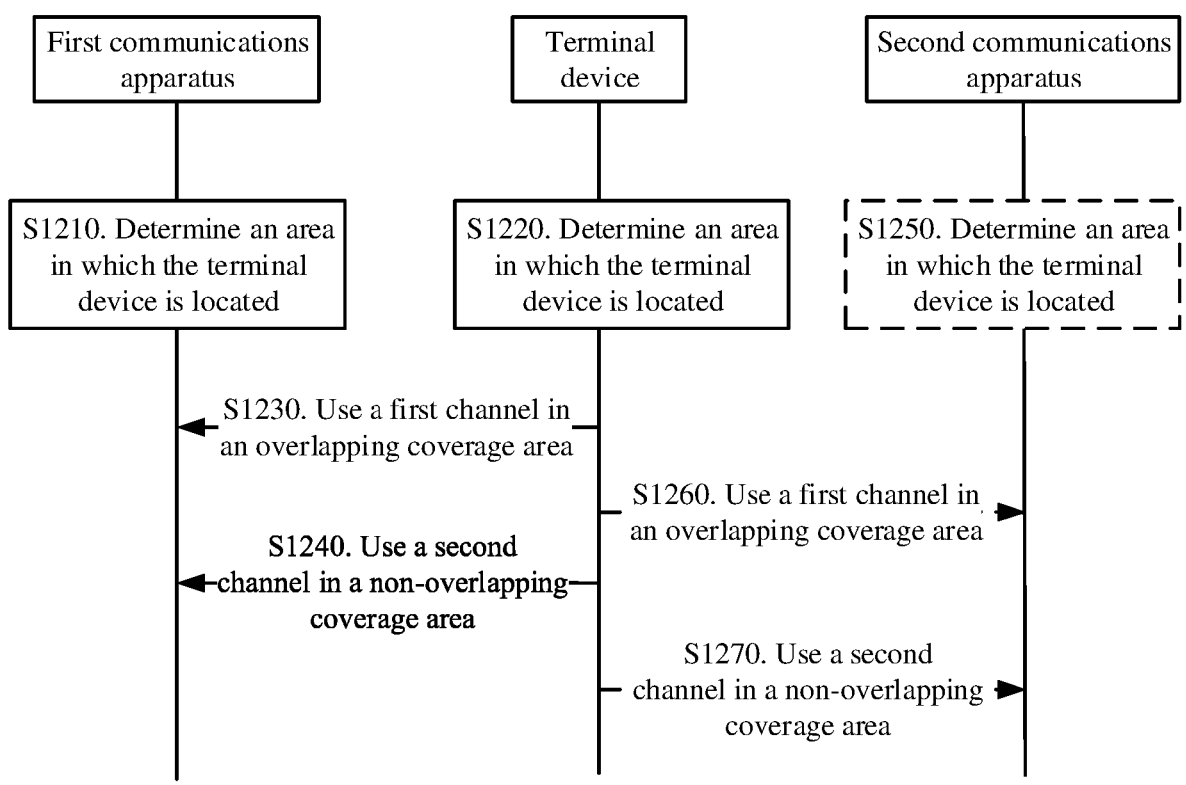
FIG. 12 is a schematic flowchart of another information transmission method according to an embodiment of this application.

FIG. 12 is a schematic flowchart of another information transmission method 1200 according to an embodiment of this application. The method 1200 may be applied to the communication system 100 shown in FIG. 1 and the application scenario 200 shown in FIG. 2. However, this is not limited in this embodiment of this application.

S1210. A first communications apparatus determines an area in which a terminal device is located, where the area includes overlapping coverage area between the first communications apparatus and at least one second communications apparatus, and, non-overlapping coverage area between the first communications apparatus and the at least one second communications apparatus, and the first communications apparatus is adjacent to the at least one second communications apparatus.

S1220. The terminal device determines an area in which the terminal device is located, where the area includes the overlapping coverage areas of the first communications apparatus and the at least one second communications apparatus and the non-overlapping coverage areas of the first communications apparatus and the at least one second communications apparatus, and the first communications apparatus is adjacent to the at least one second communications apparatus.

S1230. If the terminal device is located in the overlapping coverage areas, the terminal device sends information to the first communications apparatus through the second channel.

Correspondingly, if the terminal device is located in the overlapping coverage areas, the first communications apparatus receives, through the second channel, information sent by the terminal device.

S1240. If the terminal device is located in the non-overlapping coverage areas, the terminal device sends information to the first communications apparatus through the first channel.

Correspondingly, if the terminal device is located in the non-overlapping coverage areas, the first communications apparatus receives, through the first channel, information sent by the terminal device.

The at least one second communications apparatus receives information through the second channel in the overlapping coverage areas of the at least one second communications apparatus and the first communications apparatus, and receives information through the first channel in the non-overlapping coverage areas of the at least one second communications apparatus and the first communications apparatus.

According to the information transmission method in this embodiment of this application, the same first channel is used for uplink information transmission in overlapping coverage areas of adjacent network devices, and the second channel different from the first channel is used for uplink information transmission in non-overlapping coverage areas of the adjacent network devices. This helps reduce interference between the adjacent network devices, and improves system performance.

Optionally, because the terminal device is mobile, if the terminal device is located in a coverage area of a second communications apparatus, the terminal device may choose to access the second communications apparatus. Therefore, the method 1200 further includes the following steps.

S1250. The second communications apparatus determines an area in which the terminal device is located, where the area includes overlapping coverage areas of the first communications apparatus and the second communications apparatus and non-overlapping coverage areas of the first communications apparatus and the second communications apparatus, and the first communications apparatus is adjacent to the second communications apparatus.

S1260. If the terminal device is located in the overlapping coverage areas, the terminal device sends information to the second communications apparatus through the second channel.

Correspondingly, if the terminal device is located in the overlapping coverage areas, the second communications apparatus receives, through the second channel, information sent by the terminal device.

S1270. If the terminal device is located in the non-overlapping coverage areas, the terminal device sends information to the second communications apparatus through the first channel.

Correspondingly, if the terminal device is located in the non-overlapping coverage areas, the second communications apparatus receives, through the first channel, information sent by the terminal device.

Specifically, before information transmission is performed between a network device and the terminal device, both the network device and the terminal device need to determine an area in which the terminal device is located. Further, the network device and the terminal device may select a corresponding channel based on the area in which the terminal device is located, to transmit information. It should be understood that uplink transmission in the overlapping coverage areas corresponds to the second channel, and uplink transmission in the non-overlapping coverage areas corresponds to the first channel. In this embodiment of this application, a channel is used to represent a frequency resource used for information transmission between a network device and the terminal device. To be specific, in an overlapping coverage area, a second frequency resource may be used for uplink information transmission between the network device and the terminal device, and in a non-overlapping coverage area, a first frequency resource may be used for uplink information transmission between the network device and the terminal device. It should be further understood that a correspondence between an area and a channel may be agreed on by the network device and the terminal device according to a protocol, or may be configured by the network device for the terminal device by using signaling. This is not limited in this embodiment of this application.

Therefore, if the terminal device is located in the overlapping coverage area of the first communications apparatus, the terminal device sends information to the first communications apparatus through the second channel, and correspondingly the first communications apparatus receives, through the second channel, information sent by the terminal device. If the terminal device is located in the non-overlapping coverage area of the first communications apparatus, the terminal device sends information to the first communications apparatus through the first channel, and correspondingly the first communications apparatus receives, through the first channel, information sent by the terminal device. At the same time, to avoid interference caused by information transmission between the at least one second communications apparatus adjacent to the first communications apparatus and another terminal device, the at least one second communications apparatus receives information from the another terminal device through the second channel in the overlapping coverage areas of the at least one second communications apparatus and the first communications apparatus, and receives information from the another terminal device through the first channel in the non-overlapping coverage areas of the at least one second communications apparatus and the first communications apparatus. It should be understood that a case in which the terminal device is located in the coverage area of the at least one second communications apparatus is similar to the case in which the terminal device is located in the coverage area of the first communications apparatus. Details are not described herein again.

Figure 13:
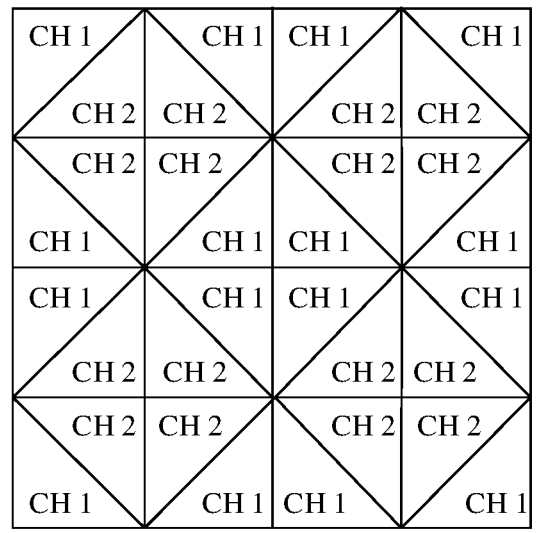
FIG. 13 is a schematic diagram of uplink channel allocation according to an embodiment of this application.

FIG. 13 is a schematic diagram of uplink channel allocation according to an embodiment of this application. Herein, a CH 1 is used to indicate the first channel, and a CH 2 is used to indicate the second channel. A coverage area of each of a plurality of network devices is divided into two areas an area that overlaps with a coverage area of an adjacent network device or an area that does not overlap with the coverage area of the adjacent network device, referred to as an overlapping coverage area and a non-overlapping coverage area.

As shown in FIG. 13, in uplink, the CH 2 is used in an overlapping coverage area, and the CH 1 is used in a non-overlapping coverage area. In an application scenario in which there are a plurality of network devices, this can avoid interference between uplink transmission of adjacent network devices and improve system performance.

Interference in this embodiment of this application is analyzed below with reference to FIG. 14.

Figure 14:
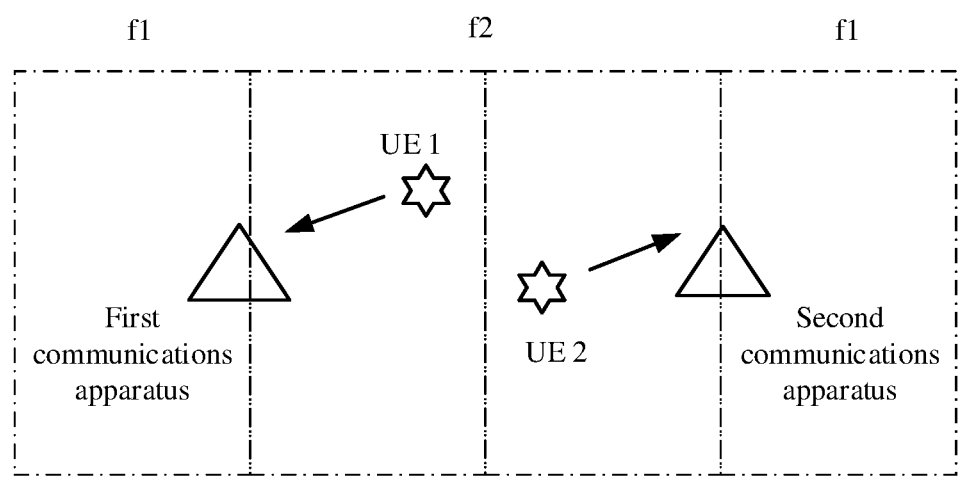
FIG. 14 is a schematic diagram of another information transmission scenario according to an embodiment of this application.

FIG. 14 is a schematic diagram of another information transmission scenario according to an embodiment of this application. In FIG. 14, UE 1 is a terminal device in the coverage area of the first communications apparatus, UE 2 is a terminal device in the coverage area of the second communications apparatus, both the UE 1 and the UE 2 are located in the overlapping coverage areas, and the UE 1 and the UE 2 use a frequency resource f2 (namely, the second channel) to send information. The UE 1 uses f2 to send information to the first communications apparatus, and the UE 2 uses f2 to send information to the second communications apparatus. In this case, transmit beam directions of the UE 2 and the UE1 are opposite. Therefore, a signal sent by the UE 2 causes no interference to the first communications apparatus. Likewise, a signal sent by the UE1 causes no interference to the second communications apparatus.

It can be learned from the foregoing analysis that the information transmission method in this embodiment of this application can effectively avoid interference caused by uplink transmission of the second communications apparatus adjacent to the first communications apparatus to uplink transmission of the first communications apparatus. It should be understood that FIG. 14 merely shows a possible example case. Another case is similar to the case in FIG. 14. Details are not described herein again.

According to the information transmission method in this embodiment of this application, the same first channel is used for uplink information transmission in overlapping coverage areas of adjacent network devices, and the second channel different from the first channel is used for uplink information transmission in non-overlapping coverage areas of the adjacent network devices. This helps reduce interference between the adjacent network devices, and improves system performance.

In an optional embodiment, the determining, by a first communications apparatus, an area in which a terminal device is located includes sending, by the first communications apparatus, measurement information through the first channel in the overlapping coverage areas, and sending the measurement information through the second channel in the non-overlapping coverage areas, sending, by the at least one second communications apparatus, the measurement information through the first channel in the overlapping coverage areas, and sending the measurement information through the second channel in the non-overlapping coverage areas, where the measurement information is used by the terminal device to measure a channel, receiving, by the first communications apparatus, access request information sent by the terminal device through the first channel or the second channel, where the access request information is used by the terminal device to request to access the first communications apparatus by using the first channel or the second channel, and determining, by the first communications apparatus based on the access request information, the area in which the terminal device is located.

Correspondingly, before the determining, by a terminal device, an area in which the terminal device is located, the method further includes receiving, by the terminal device, the measurement information sent by the first communications apparatus and/or the at least one second communications apparatus, where the measurement information is used by the terminal device to measure a channel, and the determining, by a terminal device, an area in which the terminal device is located includes determining, by the terminal device based on the received measurement information and signal energy of the measurement information, the area in which the terminal device is located.

Specifically, the first communications apparatus and the at least one second communications apparatus may send the measurement information through the first channel in the overlapping coverage areas, and send the measurement information through the second channel in non-overlapping coverage areas. For example, the measurement information is broadcast beacon information or broadcast pilot information, and is used by the terminal device to measure a channel. A location of the terminal device determines a signal that can be received by the terminal device and energy of the received signal. Therefore, the terminal device can determine, based on a sender of the received measurement information and signal energy of the measurement information, the area in which the terminal device is located.

After determining the area in which the terminal device is located, the terminal device may choose to use a channel corresponding to the area to send the access request information to the first communications apparatus or the second communications apparatus. In this embodiment of this application, assuming that the terminal device is located in the coverage area of the first communications apparatus, the terminal device selects the first channel or the second channel to send the access request information to the first communications apparatus, to request to access the first communications apparatus, and the first communications apparatus may determine, based on the access request information sent by the terminal device, the area in which the terminal device is located.

In an optional embodiment, the determining, by the terminal device based on the received measurement information and signal energy of the measurement information, the area in which the terminal device is located includes if the terminal device receives the measurement information sent by the first communications apparatus through the second channel and the measurement information sent by the at least one second communications apparatus through the first channel, and a difference obtained by subtracting signal energy of the measurement information sent by the at least one second communications apparatus through the first channel from signal energy of the measurement information sent by the first communications apparatus through the second channel is greater than a first threshold, determining, by the terminal device, that the terminal device is located in the non-overlapping coverage area of the first communications apparatus, if the terminal device receives the measurement information sent by the first communications apparatus through the second channel, the measurement information sent by the first communications apparatus through the first channel, and the measurement information sent by the at least one second communications apparatus through the first channel, and an absolute value of a difference between the signal energy of the measurement information sent by the first communications apparatus through the second channel and signal energy of the measurement information sent by the first communications apparatus through the first channel is less than the first threshold, determining, by the terminal device, that the terminal device is located at a common boundary between the overlapping coverage area of the first communications apparatus and the non-overlapping coverage area of the first communications apparatus, if the terminal device receives the measurement information sent by the first communications apparatus through the first channel and the measurement information sent by the at least one second communications apparatus through the first channel, and a difference obtained by subtracting the signal energy of the measurement information sent by the at least one second communications apparatus through the first channel from the signal energy of the measurement information sent by the first communications apparatus through the first channel is greater than the first threshold, determining, by the terminal device, that the terminal device is located in the overlapping coverage area of the first communications apparatus, and if the terminal device receives the measurement information sent by the first communications apparatus through the first channel and the measurement information sent by the at least one second communications apparatus through the first channel, and an absolute value of the difference between the signal energy of the measurement information sent by the first communications apparatus through the first channel and the signal energy of the measurement information sent by the at least one second communications apparatus through the first channel is less than the first threshold, determining, by the terminal device, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, sending, by the terminal device, access request information to the first communications apparatus through the first channel or the second channel, where the access request information is used to request to access the first communications apparatus, and if the terminal device is located at the common boundary between the overlapping coverage area of the first communications apparatus and the overlapping coverage area of the at least one second communications apparatus, sending, by the terminal device, the access request information to the first communications apparatus through the first channel, or sending access request information to the at least one second communications apparatus through the first channel.

In an optional embodiment, the access request information includes at least one of the following information: signal energy of measurement information from the first communications apparatus on the first channel, signal energy of measurement information from the first communications apparatus on the second channel, signal energy of the at least one second communications apparatus on the first channel, and signal energy of the at least one second communications apparatus on the second channel, the determining, by the first communications apparatus based on a channel used by the terminal device to send the access request information, the area in which the terminal device is located includes if the access request information includes the signal energy of measurement information from the first communications apparatus on the second channel and the signal energy of the at least one second communications apparatus on the first channel, and a difference obtained by subtracting the signal energy of the at least one second communications apparatus on the first channel from the signal energy of measurement information from the first communications apparatus on the second channel is greater than a first threshold, determining, by the first communications apparatus, that the terminal device is located in the non-overlapping coverage area of the first communications apparatus, if the access request information includes the signal energy of measurement information from the first communications apparatus on the first channel and the signal energy of measurement information from the first communications apparatus on the second channel, and an absolute value of a difference between the signal energy of measurement information from the first communications apparatus on the first channel and the signal energy of measurement information from the first communications apparatus on the second channel is less than the first threshold, determining, by the first communications apparatus, that the terminal device is located at a common boundary between the overlapping coverage area of the first communications apparatus and the non-overlapping coverage area of the first communications apparatus, if the access request information includes the signal energy of measurement information from the first communications apparatus on the first channel and the signal energy of the at least one second communications apparatus on the first channel, and a difference obtained by subtracting the signal energy of the at least one second communications apparatus on the first channel from the signal energy of measurement information from the first communications apparatus on the first channel is greater than the first threshold, determining, by the first communications apparatus, that the terminal device is located in the overlapping coverage area of the first communications apparatus, and if the access request information includes the signal energy of measurement information from the first communications apparatus on the first channel and the signal energy of the at least one second communications apparatus on the first channel, and an absolute value of the difference between the signal energy of measurement information from the first communications apparatus on the first channel and the signal energy of the at least one second communications apparatus on the first channel is less than the first threshold, determining, by the first communications apparatus, that the terminal device is located at a common boundary between the overlapping coverage area of the first communications apparatus and the overlapping coverage area of the at least one second communications apparatus, and the method further includes if the terminal device is located at the common boundary between the overlapping coverage area of the first communications apparatus and the non-overlapping coverage area of the first communications apparatus, determining, by the first communications apparatus based on a remaining channel capacity of the first channel and a remaining channel capacity of the second channel, a channel used for information transmission between the first communications apparatus and the terminal device, and if the terminal device is located at the common boundary between the overlapping coverage area of the first communications apparatus and the overlapping coverage area of the at least one second communications apparatus, determining, by the first communications apparatus based on the remaining channel capacity of the first channel, whether to allow the terminal device to access the first communications apparatus.

It should be understood that in FIG. 8 to FIG. 11, how the terminal device and the network device determine the area in which the terminal device is located has been described in detail. Therefore, details are not described herein again.

Figure 15:
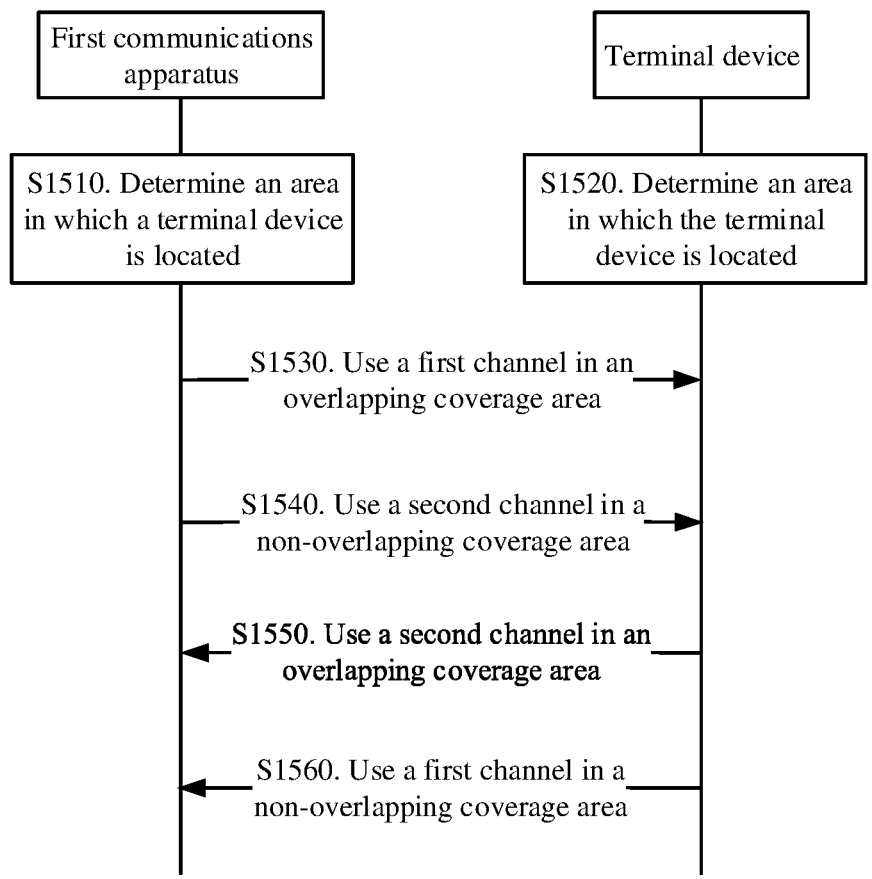
FIG. 15 is a schematic flowchart of another information transmission method according to an embodiment of this application.

FIG. 15 is a schematic flowchart of another information transmission method 1500 according to an embodiment of this application. The method 1500 may be applied to the communication system boo shown in FIG. 1 and the application scenario 200 shown in FIG. 2. However, this is not limited in this embodiment of this application.

S1510. A first communications apparatus determines an area in which a terminal device is located, where the area includes overlapping coverage area between the first communications apparatus and at least one second communications apparatus, or, non-overlapping coverage area between the first communications apparatus and the at least one second communications apparatus, and the first communications apparatus is adjacent to the at least one second communications apparatus.

S1520. The terminal device determines an area in which the terminal device is located, where the area includes the overlapping coverage areas of the first communications apparatus and the at least one second communications apparatus or the non-overlapping coverage areas of the first communications apparatus and the at least one second communications apparatus, and the first communications apparatus is adjacent to the at least one second communications apparatus.

S1530. If the terminal device is located in the overlapping coverage areas, the first communications apparatus sends information to the terminal device through a first channel.

Correspondingly, if the terminal device is located in the overlapping coverage areas, the terminal device receives, through the first channel, information sent by the first communications apparatus.

S1540. If the terminal device is located in the non-overlapping coverage areas, the first communications apparatus sends information to the terminal device through a second channel different from the first channel, and the at least one second communications apparatus sends information through the first channel in the overlapping coverage areas, and sends information through the second channel in the non-overlapping coverage areas.

Correspondingly, if the terminal device is located in the non-overlapping coverage areas, the terminal device receives, through the second channel different from the first channel, information sent by the first communications apparatus.

S1550. If the terminal device is located in the overlapping coverage areas, the terminal device sends information to the first communications apparatus through the second channel.

Correspondingly, if the terminal device is located in the overlapping coverage areas, the first communications apparatus receives, through the second channel, information sent by the terminal device.

S1560. If the terminal device is located in the non-overlapping coverage areas, the terminal device sends information to the first communications apparatus through the first channel.

Correspondingly, if the terminal device is located in the non-overlapping coverage areas, the first communications apparatus receives, through the first channel, information sent by the terminal device.

The at least one second communications apparatus receives information through the second channel in the overlapping coverage areas, and receives information through the first channel in the non-overlapping coverage areas.

The information transmission method in this embodiment of this application can not only avoid interference caused by downlink transmission of the second communications apparatus to downlink transmission of the first communications apparatus and interference caused by uplink transmission of the second communications apparatus to uplink transmission of the first communications apparatus, but also avoid interference caused by uplink transmission (or downlink transmission) of the second communications apparatus to downlink transmission (or uplink transmission) of the first communications apparatus, and improve system performance.

Figure 16:
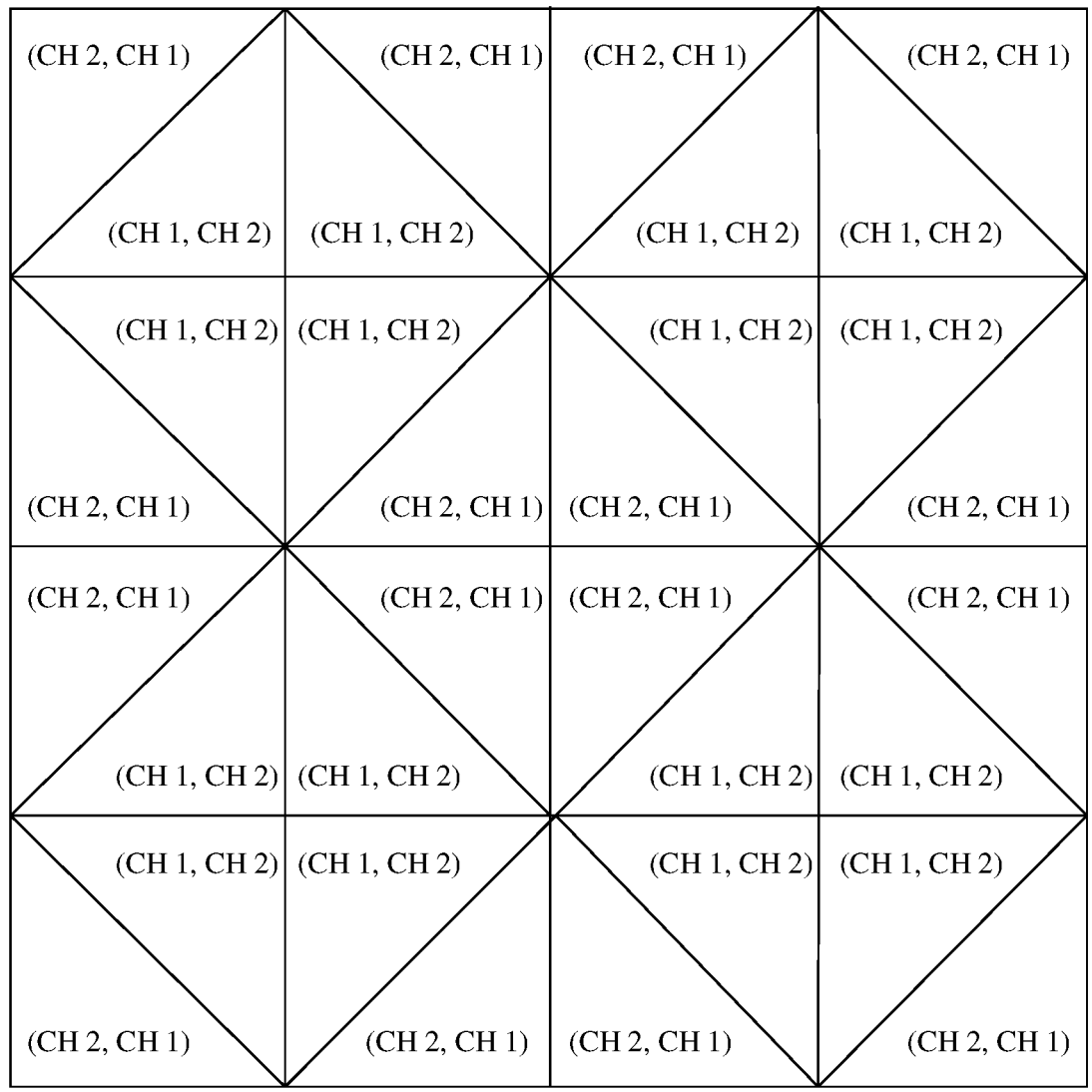
FIG. 16 is a schematic diagram of uplink and downlink channel allocation according to an embodiment of this application.

FIG. 16 is a schematic diagram of uplink and downlink channel allocation according to an embodiment of this application. Herein, a CH 1 is used to indicate the first channel, and a CH 2 is used to indicate the second channel. A coverage area of each of a plurality of network devices is divided into two areas: an area that overlaps with a coverage area of an adjacent network device or an area that does not overlap with the coverage area of the adjacent network device, referred to as an overlapping coverage area and a non-overlapping coverage area.

As shown in FIG. 16, in downlink channel, the CH 2 is used in an overlapping coverage area, and the CH 1 is used in a non-overlapping coverage area, and in uplink, the CHi is used in an overlapping coverage area, and the CH 2 is used in a non-overlapping coverage area. In an application scenario in which there are a plurality of network devices, this can not only avoid interference between downlink transmission of adjacent network devices and interference between uplink transmission of adjacent network devices, but also avoid interference caused by uplink transmission (or downlink transmission) to downlink transmission (or uplink transmission) between the adjacent network devices, and improve system performance.

It should be understood that, sequence numbers of the foregoing processes do not mean execution sequences. The execution sequences of the processes should be determined according to functions and internal logic of the processes, and should not be construed as any limitation on the implementation processes of the embodiments of this application.

The foregoing describes in detail the information transmission method according to the embodiments of this application with reference to FIG. 1 to FIG. 16. The following describes in detail an information transmission apparatus and system according to the embodiments of this application with reference to FIG. 17 to FIG. 20.

Figure 17:
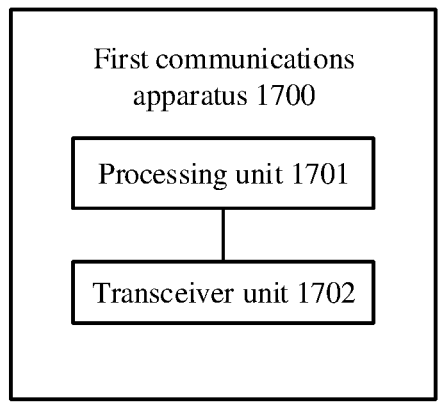
FIG. 17 is a schematic block diagram of a first communications apparatus according to an embodiment of this application.

FIG. 17 shows a first communications apparatus 1700 according to an embodiment of this application. The first communications apparatus 1700 includes a processing unit 1701, configured to determine an area in which a terminal device is located, where the area includes overlapping coverage area between the first communications apparatus and at least one second communications apparatus, and, non-overlapping coverage area between the first communications apparatus and the at least one second communications apparatus, and the first communications apparatus is adjacent to the at least one second communications apparatus, and schedule a transceiver unit 1702 to perform corresponding processing based on a determining result, and the transceiver unit 1702, configured to send information to the terminal device through a first channel if the terminal device is located in the overlapping coverage areas, and send information to the terminal device through a second channel different from the first channel if the terminal device is located in the non-overlapping coverage areas.

By using the transceiver unit, the first communications apparatus may use the same first channel in overlapping coverage areas of the first communications apparatus and an adjacent network device to perform downlink information transmission, and use the second channel different from the first channel in non-overlapping coverage areas of the first communications apparatus and the adjacent network device to perform downlink information transmission. This helps reduce interference between the adjacent network devices, and improves system performance.

The transceiver unit 1702 is further configured to receive, through the second channel, information sent by the terminal device if the terminal device is located in the overlapping coverage areas, and receive, through the first channel different from the second channel, information sent by the terminal device if the terminal device is located in the non-overlapping coverage areas.

By using the transceiver unit, the first communications apparatus 1700 may use the same first channel in the overlapping coverage areas of the first communications apparatus and the adjacent network device to perform uplink information transmission, and use the second channel different from the first channel in the non-overlapping coverage areas of the first communications apparatus and the adjacent network device to perform uplink information transmission. This helps reduce interference between the adjacent network devices, and improves system performance.

The transceiver unit 1702 is further configured to if the terminal device is located in the overlapping coverage areas, send information to the terminal device through the first channel, and receive, through the second channel different from the first channel, information sent by the terminal device.

The transceiver unit 1702 is further configured to if the terminal device is located in the non-overlapping coverage areas, send information to the terminal device through the second channel different from the first channel, and receive, through the first channel, information sent by the terminal device.

The transceiver unit can not only avoid interference caused by downlink transmission of the second communications apparatus to downlink transmission of the first communications apparatus and interference caused by uplink transmission of the second communications apparatus to uplink transmission of the first communications apparatus, but also avoid interference caused by uplink transmission (or downlink transmission) of the second communications apparatus to downlink transmission (or uplink transmission) of the first communications apparatus, and improve system performance.

The first communications apparatus on a network side described in FIG. 17 may be implemented in a plurality of product forms.

Figure 18:
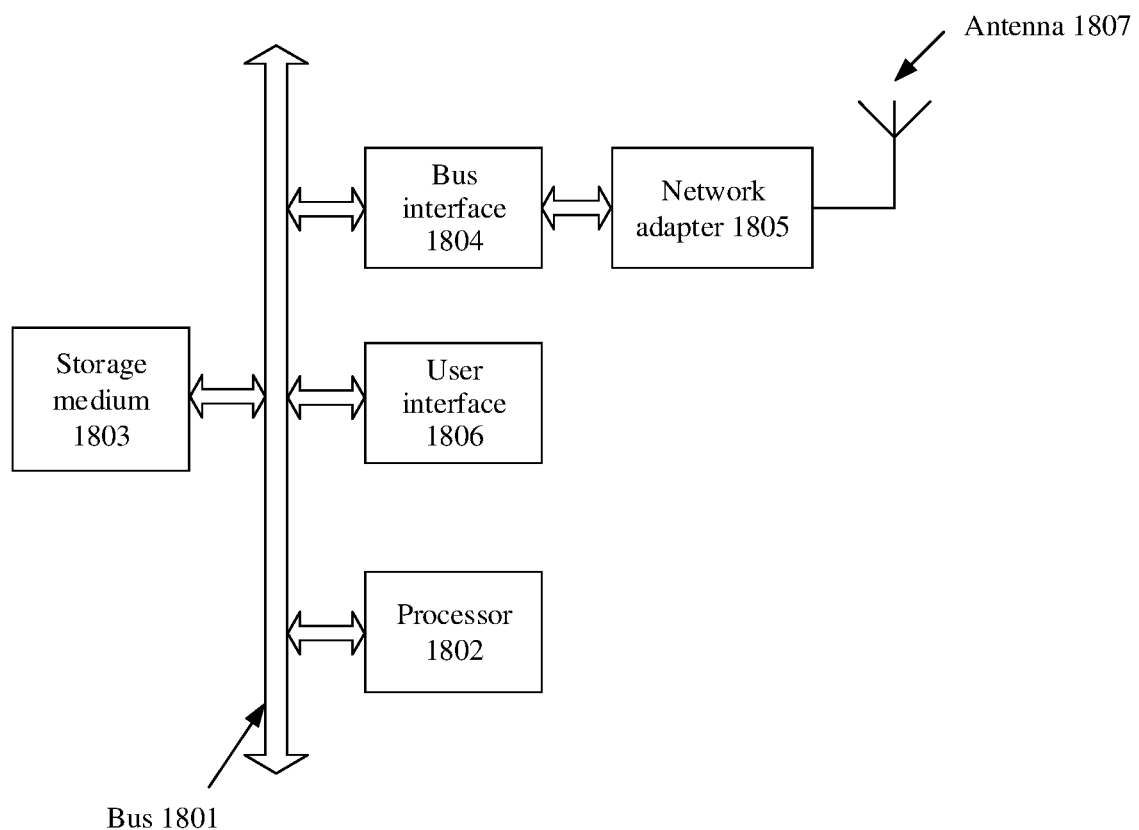
FIG. 18 is a form diagram of a product according to an embodiment of this application.

For example, in a possible product form, the first communications apparatus may be implemented by using a bus 1801 as a general bus architecture. As shown in FIG. 18, the bus 1801 may include any quantity of interconnect buses and bridges according to specific application and an overall design constraint condition of the first communications apparatus. The bus 1801 connects various circuits together. These circuits include a processor 1802, a storage medium 1803, a bus interface 1804, and a user interface 1806.

The first communications apparatus uses the bus interface 1804 to connect a network adapter 1805 and the like to the bus 1801. The network adapter 1805 may be configured to implement a signal processing function at a physical layer in a wireless local area network and send or receive a radio frequency signal by using an antenna 1807. In this application, the antenna 1807 is configured to implement information receiving and sending performed by the first communications apparatus in the foregoing method embodiments.

The user interface 1806 may be connected to a user terminal such as a keyboard, a display, a mouse, a joystick, or the like. The bus 1801 may further connect various other circuits such as a timing source, a peripheral device, a voltage regulator, and a power management circuit. These circuits are well-known in the art, and therefore are not described in detail.

The processor 1802 is responsible for bus management and general processing (including executing software stored in the storage medium 1803). The processor 1802 may be implemented by one or more general-purpose processors and/or dedicated processors. For example, the processor includes a microprocessor, a microcontroller, a DSP processor, and another circuit capable of executing software. The software should be broadly construed as representation of an instruction, data, or any combination thereof, regardless of whether the software is referred to as software, firmware, middleware, microcode, a hardware description language, or the like. In this application, the processor 1802 is configured to implement all processing except information receiving and sending performed by the first communications apparatus in the foregoing method embodiments.

In addition, in FIG. 18, the storage medium 1803 is separated from the processor 1802. However, a person skilled in the art easily understands that the storage medium 1803 or any part of the storage medium 1803 may be located outside the first communications apparatus. For example, the storage medium 1803 may include a transmission line, a carrier waveform modulated by using data, and/or a computer product separated from a wireless node. These media may be accessed by the processor 1802 by using the bus interface 1804. Alternatively, the storage medium 1803 or any part of the storage medium 1803 may be integrated into the processor 1802. For example, the storage medium 1803 may be a cache and/or a general-purpose register. In this application, the storage medium 1803 is configured to store a computer program, and the computer program is executed by the processor 1802, to implement all processing performed by the processor 1802.

Alternatively, in another possible product form, the first communications apparatus may be configured as a general-purpose processing system, for example, collectively referred to as a chip. The general-purpose processing system includes one or more microprocessors providing a processor function, and an external memory serving as at least a part of the storage medium 1803. All of these are connected to another support circuit by using an external bus architecture.

Alternatively, in another possible product form, the first communications apparatus may be implemented by using the following: an application-specific integrated circuit (ASIC) having the processor 1802, the bus interface 1804, and the user interface 1806, and at least a part of the storage medium 1803 integrated in a single chip.

Alternatively, in another possible product form, the first communications apparatus may be implemented by using one or more field programmable gate arrays (FPGA), a programmable logic device (PLD), a controller, a state machine, gate logic, a discrete hardware component, any other suitable circuit, or any combination of circuits that can perform various functions described throughout this application.

It should be understood that the first communications apparatus described in FIG. 17 and FIG. 18 has any function of the first communications apparatus in the foregoing method embodiments. Details are not described herein again.

Figure 19:
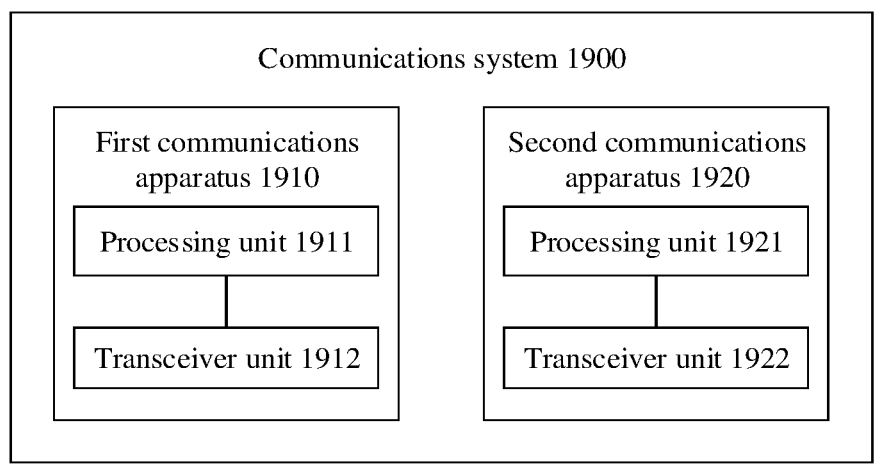
FIG. 19 is a schematic block diagram of a communications system according to an embodiment of this application.

FIG. 19 shows a communications system 1900 according to an embodiment of this application. The communications system includes a first communications apparatus 1910 and a second communications apparatus 1920.

The first communications apparatus 1910 includes a processing unit 1911, configured to determine an area in which a terminal device is located, where the area includes overlapping coverage area between the first communications apparatus and the at least one second communications apparatus, and, non-overlapping coverage area between the first communications apparatus and the at least one second communications apparatus, and the first communications apparatus is adjacent to the at least one second communications apparatus, and a transceiver unit 1912, configured to send information to the terminal device through a first channel if the terminal device is located in the overlapping coverage areas, and send information to the terminal device through a second channel different from the first channel if the terminal device is located in the non-overlapping coverage areas.

The second communications apparatus 1920 includes a processing unit 1921, configured to determine an area in which the terminal device is located, where the area includes the overlapping coverage areas of the second communications apparatus and the first communications apparatus and the non-overlapping coverage areas of the second communications apparatus and the first communications apparatus, and the first communications apparatus is adjacent to the at least one second communications apparatus, and a transceiver unit 1922, configured to send information through the first channel in the overlapping coverage areas of the second communications apparatus and the first communications apparatus, and send information through the second channel in the non-overlapping coverage areas of the second communications apparatus and the first communications apparatus.

Alternatively, the first communications apparatus 1910 includes the processing unit 1911, configured to determine the area in which the terminal device is located, where the area includes the overlapping coverage areas of the first communications apparatus and the at least one second communications apparatus and the non-overlapping coverage areas of the first communications apparatus and the at least one second communications apparatus, and the first communications apparatus is adjacent to the at least one second communications apparatus, and the transceiver unit 1912, configured to receive, through the second channel, information sent by the terminal device if the terminal device is located in the overlapping coverage areas, and receive, through the first channel different from the second channel, information sent by the terminal device if the terminal device is located in the non-overlapping coverage areas.

The second communications apparatus 1920 includes the processing unit 1921, configured to determine the area in which the terminal device is located, where the area includes the overlapping coverage areas of the second communications apparatus and the first communications apparatus and the non-overlapping coverage areas of the second communications apparatus and the first communications apparatus, and the first communications apparatus is adjacent to the at least one second communications apparatus, and the transceiver unit 1922, configured to receive information through the second channel in the overlapping coverage areas of the second communications apparatus and the first communications apparatus, and receive information through the first channel in the non-overlapping coverage areas of the second communications apparatus and the first communications apparatus.

In the communications system, the same first channel is used for downlink information transmission in overlapping coverage areas of adjacent network devices, and the second channel different from the first channel is used for downlink information transmission in non-overlapping coverage areas of the adjacent network devices. This helps reduce interference between the adjacent network devices, and improves system performance.

Alternatively, the same second channel is used for uplink information transmission in overlapping coverage areas of adjacent network devices, and the first channel different from the second channel is used for uplink information transmission in non-overlapping coverage areas of the adjacent network devices. This helps reduce interference between the adjacent network devices, and improves system performance.

Further, the transceiver unit 1912 of the first communications apparatus 1910 is further configured to if the terminal device is located in the overlapping coverage areas, send information to the terminal device through the first channel, and receive, through the second channel different from the first channel, information sent by the terminal device, and if the terminal device is located in the non-overlapping coverage areas, send information to the terminal device through the second channel different from the first channel, and receive, through the first channel, information sent by the terminal device.

The transceiver unit 1922 of the second communications apparatus 1920 is further configured to in the overlapping coverage areas of the second communications apparatus and the first communications apparatus, send information through the first channel, and receive information through the second channel different from the first channel, and in the non-overlapping coverage areas of the second communications apparatus and the first communications apparatus, send information through the second channel different from the first channel, and receive information through the first channel.

Further, in the communications system, this can not only avoid interference caused by downlink transmission of the second communications apparatus to downlink transmission of the first communications apparatus and interference caused by uplink transmission of the second communications apparatus to uplink transmission of the first communications apparatus, but also avoid interference caused by uplink transmission (or downlink transmission) of the second communications apparatus to downlink transmission (or uplink transmission) of the first communications apparatus, and improve system performance.

It should be understood that the first communications apparatus 1910 and the second communications apparatus 1920 in FIG. 19 respectively have any function of the first communications apparatus in the foregoing method embodiments and any function of the second communications apparatus in the foregoing method embodiments. Details are not described herein again.

In addition, the first communications apparatus 1910 and the second communications apparatus 1920 may be implemented in a plurality of product forms. A specific product form example is the same as that recorded above. Details are not described herein again.

Figure 20:
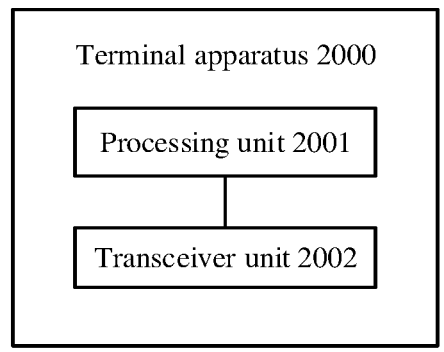
FIG. 20 is a schematic block diagram of a terminal apparatus according to an embodiment of this application.

FIG. 20 shows a terminal apparatus 2000 according to an embodiment of this application. The terminal apparatus 2000 includes a processing unit 2001, configured to determine an area in which the terminal apparatus is located, where the area includes overlapping coverage area between a first communications apparatus and at least one second communications apparatus, and, non-overlapping coverage area between the first communications apparatus and the at least one second communications apparatus, and the first communications apparatus is adjacent to the at least one second communications apparatus, and a transceiver unit 2002, configured to receive, through a first channel, information sent by the first communications apparatus and/or the at least one second communications apparatus if the terminal apparatus is located in the overlapping coverage areas, and receive, by the terminal apparatus through a second channel different from the first channel, information sent by the first communications apparatus and/or the at least one second communications apparatus if the terminal apparatus is located in the non-overlapping coverage areas.

The same first channel is used for downlink information transmission in overlapping coverage areas of adjacent network devices, and the second channel different from the first channel is used for downlink information transmission in non-overlapping coverage areas of the adjacent network devices. This helps reduce interference between the adjacent network devices, and improves system performance.

Alternatively, the terminal apparatus 2000 includes the processing unit 2001, configured to determine the area in which the terminal apparatus is located, where the area includes the overlapping coverage areas of the first communications apparatus and the at least one second communications apparatus and the non-overlapping coverage areas of the first communications apparatus and the at least one second communications apparatus, and the first communications apparatus is adjacent to the at least one second communications apparatus, and the transceiver unit 2002, configured to send, by the terminal apparatus, information to the first communications apparatus and/or the at least one second communications apparatus through the second channel if the terminal apparatus is located in the overlapping coverage areas, and send, by the terminal apparatus, information to the first communications apparatus and/or the at least one second communications apparatus through the first channel if the terminal apparatus is located in the non-overlapping coverage areas.

The same first channel is used for uplink information transmission in overlapping coverage areas of adjacent network devices, and the second channel different from the first channel is used for uplink information transmission in non-overlapping coverage areas of the adjacent network devices. This helps reduce interference between the adjacent network devices, and improves system performance.

Further, the transceiver unit 2002 is further configured to if the terminal apparatus is located in the overlapping coverage areas, send, by the terminal apparatus, information to the first communications apparatus and/or the at least one second communications apparatus through the second channel, and receive, by the terminal apparatus through the first channel, information sent by the first communications apparatus and/or the at least one second communications apparatus, and if the terminal apparatus is located in the non-overlapping coverage areas, send, by the terminal apparatus, information to the first communications apparatus and/or the at least one second communications apparatus through the first channel, and receive, by the terminal apparatus through the second channel, information sent by the first communications apparatus and/or the at least one second communications apparatus.

The transceiver unit 2002 can not only avoid interference caused by downlink transmission of the second communications apparatus to downlink transmission of the first communications apparatus and interference caused by uplink transmission of the second communications apparatus to uplink transmission of the first communications apparatus, but also avoid interference caused by uplink transmission (or downlink transmission) of the second communications apparatus to downlink transmission (or uplink transmission) of the first communications apparatus, and improve system performance.

The terminal apparatus shown in FIG. 20 may be implemented in a plurality of product forms. A specific product form example is the same as that recorded in FIG. 18. Details are not described herein again.

In addition, it should be understood that the terminal apparatus 2000 in FIG. 20 has any function of the terminal device in each of the foregoing method embodiments. Details are not described herein again.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by using electronic hardware, computer software, or a combination thereof. To clearly describe the interchangeability between the hardware and the software, the foregoing has generally described steps and compositions of each embodiment according to functions. Whether the functions are performed by using hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
   determining, by a terminal device, an area in which the terminal device is located, wherein the area comprises an overlapping coverage area between a first communications apparatus and at least one second communications apparatus, and further comprises a non-overlapping coverage area between the first communications apparatus and the at least one second communications apparatus, and wherein the first communications apparatus is adjacent to the at least one second communications apparatus; and
   performing at least one of a first communications process or a second communications process;
   wherein the first communications process comprises:
     performing, by the terminal device, in response to the terminal device being located in the overlapping coverage areas:
       receiving, through a first channel, information sent by at least one of the first communications apparatus or the at least one second communications apparatus; and
       sending, by the terminal device, information to the at least one of the first communications apparatus or the at least one second communications apparatus through a second channel different from the first channel; and performing, by the terminal device, in response to the terminal device being located in the non-overlapping coverage area:
receiving, through the second channel, information sent by at least one of the first communications apparatus or the at least one second communications apparatus; and
sending, through the first channel, information to the at least one of the first communications apparatus or the at least one second communications apparatus; and wherein the second communications process comprises:
performing, by the terminal device, in response to the terminal device being located in the overlapping coverage area:
sending, through the second channel, information to the at least one of the first communications apparatus or the at least one second communications apparatus; and
receiving, through the first channel, information sent by the at least one of the first communications apparatus or the at least one second communications apparatus; and
performing, by the terminal device, in response to the terminal device being located in the non-overlapping coverage area:
sending, through the first channel, information to the at least one of the first communications apparatus or the at least one second communications apparatus; and
receiving, through the second channel, information sent by the at least one of the first communications apparatus or the at least one second communications apparatus.

2. The method according to claim 1, further comprising:
receiving, by the terminal device, before the determining, by the terminal device, the area in which the terminal device is located, measurement information sent by the at least one of the first communications apparatus or the at least one second communications apparatus, wherein the measurement information is used by the terminal device to measure a channel; and
wherein the determining, by the terminal device, the area in which the terminal device is located comprises:
determining, by the terminal device according to the received measurement information and signal energy of the measurement information, the area in which the terminal device is located.

3. The method according to claim 2, wherein the determining, by the terminal device according to the received measurement information and signal energy of the measurement information, the area in which the terminal device is located comprises:
determining, by the terminal device, in response to the terminal device receiving the measurement information sent by the first communications apparatus through the second channel and the measurement information sent by the at least one second communications apparatus through the first channel, and further in response to a difference obtained by subtracting signal energy of the measurement information sent by the at least one second communications apparatus through the first channel from signal energy of the measurement information sent by the first communications apparatus through the second channel being greater than a first threshold, that the terminal device is located in the non-overlapping coverage area of the first communications apparatus;

determining, by the terminal device, in response to the terminal device receiving the measurement information sent by the first communications apparatus through the second channel, the measurement information sent by the first communications apparatus through the first channel, and the measurement information sent by the at least one second communications apparatus through the first channel, and further in response to an absolute value of a difference between the signal energy of the measurement information sent by the first communications apparatus through the second channel and signal energy of the measurement information sent by the first communications apparatus through the first channel being less than the first threshold, that the terminal device is located at a common boundary between the overlapping coverage area of the first communications apparatus and the non-overlapping coverage area of the first communications apparatus;

determining, by the terminal device, in response to the terminal device receiving the measurement information sent by the first communications apparatus through the first channel and the measurement information sent by the at least one second communications apparatus through the first channel, and further in response to a difference obtained by subtracting the signal energy of the measurement information sent by the at least one second communications apparatus through the first channel from the signal energy of the measurement information sent by the first communications apparatus through the first channel being greater than the first threshold, that the terminal device is located in the overlapping coverage area of the first communications apparatus; and determining, by the terminal device, in response to the terminal device receiving the measurement information sent by the first communications apparatus through the first channel and the measurement information sent by the at least one second communications apparatus through the first channel, and further in response to an absolute value of the difference between the signal energy of the measurement information sent by the first communications apparatus through the first channel and the signal energy of the measurement information sent by the at least one second communications apparatus through the first channel being less than the first threshold, that the terminal device is located at a common boundary between the overlapping coverage area of the first communications apparatus and the overlapping coverage area of the at least one second communications apparatus; and wherein the method further comprises:
sending, by the terminal device, in response to the terminal device being located at the common boundary between the overlapping coverage area of the first communications apparatus and the non-overlapping coverage area of the first communications apparatus, access request information to the first communications apparatus through the first channel or the second channel, wherein the access request information is used to request to access the first communications apparatus; and
performing, by the terminal device, in response to the terminal device being located at the common boundary between the overlapping coverage area of the first communications apparatus and the overlapping coverage area of the at least one second communications apparatus, at least one of sending, the access request information to the first communications apparatus through the first channel, or sending access request information to the at least one second communications apparatus through the first channel.

4. The method of claim 3, wherein the access request information comprises the signal energy of the measurement information sent by the at least one second communications apparatus through the first channel and the signal energy of the measurement information sent by the first communications apparatus through the second channel.

5. The method of claim 1, wherein the determining the area in which the terminal device is located comprises:
obtaining, by the terminal device, measurement information by measuring a channel according to measurement information sent by the at least one of the first communications apparatus or the at least one second communications apparatus; and
determining the area in which the terminal device is located according to the measurement information.

6. The method of claim 5, wherein the measurement information is sent through the first channel in the overlapping coverage area, and wherein the measurement information is sent through the second channel in the non-overlapping coverage area.

7. The method of claim 5, further comprising sending, by the terminal device, access request information to the first communications apparatus through the first channel or the second channel, wherein sending on the first channel or the second channel is determined according to a relationship of a location of terminal device to overlapping coverage area and the non-overlapping coverage area, and wherein the access request information requests access for the terminal device to the first communications apparatus.

8. A first communications apparatus, configured to operate on a network side, the first communications apparatus comprising:
a processor; and
a memory storing a program, the program including instructions that, when executed by the processor, enable the first communication apparatus to:
determine an area in which a terminal device is located, wherein the area is one of an overlapping coverage area between the first communications apparatus and at least one second communications apparatus or a non-overlapping coverage area between the first communications apparatus and the at least one second communications apparatus, and the first communications apparatus is adjacent to the at least one second communications apparatus; and
perform at least one of a first communications process or a second communications process;
wherein the instructions to perform the first communication process include instructions to:
perform, in response to the terminal device being located in the overlapping coverage area:
send information to the terminal device through a first channel; and
receive, through a second channel different from the first channel, information sent by the terminal device; and
perform, in response to the terminal device being located in the non-overlapping coverage areas:
send information to the terminal device through a second channel different from the first channel; and
receive, through the first channel, information sent by the terminal device; and
wherein the instructions to perform the second communications process include instructions to:
perform, in response to the terminal device being located in the overlapping coverage area:
receive, through the second channel, information sent by the terminal device; and
send information to the terminal device through the first channel; and perform, in response to the terminal device being located in the non-overlapping coverage area:
receive, through the first channel, information sent by the terminal device;
send information to the terminal device through the second channel.

9. The first communications apparatus according to claim 8, wherein the instructions that enable the first communication apparatus to determine the area in which the terminal device is located includes instructions that, when executed by the processor, enable the first communication apparatus to:
send measurement information through the first channel in the overlapping coverage area, wherein the measurement information is used by the terminal device to measure a channel;
send the measurement information through the second channel in the non-overlapping coverage area;
receive access request information sent by the terminal device through the first channel or the second channel, wherein the access request information is used by the terminal device to request to access the first communications apparatus; and
determine, according to the access request information, the area in which the terminal device is located.

10. The first communications apparatus according to claim 9, wherein the access request information comprises signal energy of the measurement information sent through the first channel and signal energy of the measurement information sent through the second channel, and wherein the instructions that enable the first communication apparatus to determine, according to the access request information, the area in which the terminal device is located includes instructions that, when executed by the processor, enable the first communication apparatus to:
determine, according to the signal energy of the measurement information sent through the first channel and signal energy of the measurement information sent through the second channel, the area in which the terminal device is located.

11. The first communications apparatus according to claim 10, wherein the instructions that enable the first communication apparatus to determine, according to the signal energy of the measurement information sent through the first channel and signal energy of the measurement information sent through the second channel, the area in which the terminal device is located include instructions that, when executed by the processor, enable the first communication apparatus to:
determine, according to a difference between the signal energy of the measurement information sent through the first channel and the signal energy of the measurement information sent through the second channel, the area in which the terminal device is located.

12. A terminal apparatus, located on a terminal side, the terminal apparatus comprising:
- a processor; and
- a memory storing a program, the program including instructions that, when executed by the processor, enable the terminal apparatus to:
- determine an area in which the terminal apparatus is located, wherein the area comprises an overlapping coverage area between a first communications apparatus and at least one second communications apparatus and, a non-overlapping coverage area between the first communications apparatus and the at least one second communications apparatus, and the first communications apparatus is adjacent to the at least one second communications apparatus; and
- perform at least one of a first communications process or a second communications process;
- wherein the instructions to perform the first communication process include instructions to:
  - perform, in response to the terminal apparatus being located in the overlapping coverage area:
    - receive, through a first channel, information sent by at least one of the first communications apparatus or the at least one second communications apparatus; and
    - send information to the at least one of the first communications apparatus or the at least one second communications apparatus through a second channel different from the first channel; and
  - perform, in response to the terminal apparatus being located in the non-overlapping coverage area:
    - receive, through the second channel, information sent by the at least one of the first communications apparatus or the at least one second communications apparatus; and
    - send, through the first channel, information to the at least one of the first communications apparatus or the at least one second communications apparatus; and
- wherein the instructions to perform the second communication process include instructions to:
  - perform, in response to the terminal apparatus being located in the overlapping coverage area:
    - send, through the second channel, information to the at least one of the first communications apparatus or the at least one second communications apparatus; and
    - receive, through the first channel, information sent by the at least one of the first communications apparatus or the at least one second communications apparatus; and
  - perform, in response to the terminal apparatus being located in the non-overlapping coverage area:
    - send, through the first channel, information to the at least one of the first communications apparatus or the at least one second communications apparatus; and
    - receive, through the second channel, information sent by the at least one of the first communications apparatus or the at least one second communications apparatus.

13. The terminal apparatus according to claim 12, wherein the program further includes instructions that, when executed by the processor, enable the terminal apparatus to:
receive measurement information sent by the at least one of the first communications apparatus or the at least one second communications apparatus, wherein the measurement information is used by the terminal apparatus to measure a channel;
wherein the instructions to determine the area in which the terminal apparatus is located include instructions, that, when executed by the processor, enable the terminal apparatus to determine, according to the received measurement information and signal energy of the measurement information, the area in which the terminal apparatus is located.

14. The terminal apparatus according to claim 13, wherein the instructions to determine the area in which the terminal apparatus is located, include instructions that, when executed by the processor, enable the terminal apparatus to:
determine, in response to the terminal apparatus receiving the measurement information sent by the first communications apparatus through the second channel and the measurement information sent by the at least one second communications apparatus through the first channel, and further in response to a difference obtained by subtracting signal energy of the measurement information sent by the at least one second communications apparatus through the first channel from signal energy of the measurement information sent by the first communications apparatus through the second channel being greater than a first threshold, that the terminal apparatus is located in the non-overlapping coverage area of the first communications apparatus;
determine, in response to the terminal apparatus receiving the measurement information sent by the first communications apparatus through the second channel, the measurement information sent by the first communications apparatus through the first channel, and further in response to the measurement information sent by the at least one second communications apparatus through the first channel, and an absolute value of a difference between the signal energy of the measurement information sent by the first communications apparatus through the second channel and signal energy of the measurement information sent by the first communications apparatus through the first channel being less than the first threshold, that the terminal apparatus is located at a common boundary between the overlapping coverage area of the first communications apparatus and the non-overlapping coverage area of the first communications apparatus;
determine, in response to the terminal apparatus receiving the measurement information sent by the first communications apparatus through the first channel and the measurement information sent by the at least one second communications apparatus through the first channel, and further in response to a difference obtained by subtracting the signal energy of the measurement information sent by the at least one second communications apparatus through the first channel from the signal energy of the measurement information sent by the first communications apparatus through the first channel being greater than the first threshold, that the terminal apparatus is located in the overlapping coverage area of the first communications apparatus; and
determine, in response to the terminal apparatus receiving the measurement information sent by the first communications apparatus through the first channel and the measurement information sent by the at least one second communications apparatus through the first channel, and further in response to an absolute value of the difference between the signal energy of the measurement information sent by the first communications apparatus through the first channel and the signal energy of the measurement information sent by the at least one second communications apparatus through the first channel being less than the first threshold, that the terminal apparatus is located at a common boundary between the overlapping coverage area of the first communications apparatus and the overlapping coverage area of the at least one second communications apparatus; and send, by the terminal apparatus, in response to the terminal apparatus being located at the common boundary between the overlapping coverage area of the first communications apparatus and the non-overlapping coverage area of the first communications apparatus, access request information to the first communications apparatus through the first channel or the second channel, wherein the access request information is used to request to access the first communications apparatus; and perform, in response to the terminal apparatus being located at the common boundary between the overlapping coverage area of the first communications apparatus and the overlapping coverage area of the at least one second communications apparatus, at least one of send, by the terminal apparatus, the access request information to the first communications apparatus through the first channel, or send the access request information to the at least one second communications apparatus through the first channel.

15. The terminal apparatus of claim 14, wherein the access request information comprises the signal energy of the measurement information sent by the at least one second communications apparatus through the first channel and the signal energy of the measurement information sent by the first communications apparatus through the second channel.

16. The terminal apparatus according to claim 12, wherein the instructions to determine the area in which the terminal apparatus is located include instructions, that, when executed by the processor, enable the terminal apparatus to:

obtain measurement information by measuring a channel according to measurement information sent by the at least one of the first communications apparatus or the at least one second communications apparatus; and determine the area in which the terminal apparatus is located according to the measurement information.

17. The terminal apparatus according to claim 16, wherein the measurement information is sent through the first channel in the overlapping coverage area, and wherein the measurement information is sent through the second channel in the non-overlapping coverage area.

18. The terminal apparatus according to claim 16, wherein the program further includes instructions that, when executed by the processor, enable the terminal apparatus to send, by the terminal apparatus, access request information to the first communications apparatus through the first channel or the second channel, wherein sending on the first channel or the channel is determined according to a relationship of a location of terminal apparatus to overlapping coverage area and the non-overlapping coverage area, and wherein the access request information requests access for the terminal apparatus to the first communications apparatus.

* * * * *

UNITED STATES PATENT AND TRADEMARK OFFICE
CERTIFICATE OF CORRECTION

PATENT NO. : 11,172,372 B2  
APPLICATION NO. : 16/749477  
DATED : November 9, 2021  
INVENTOR(S) : Tao Wu Page 1 of 1

It is certified that error appears in the above-identified patent and that said Letters Patent is hereby corrected as shown below:

In the Claims

Claim 8, Column 46, Lines 17-18; delete "device; send" and insert --device; and send--.

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*